United States Patent
Jung

(10) Patent No.: US 10,832,490 B2
(45) Date of Patent: *Nov. 10, 2020

(54) VIRTUAL REALITY EXPERIENCE APPARATUS CAPABLE OF PROVIDING EXPERIENCING USER WITH VIRTUAL REALITY IMAGE AND PHYSICAL MOTION

(71) Applicant: SANGWHA CO., LTD., Seoul (KR)

(72) Inventor: Beom Joon Jung, Seoul (KR)

(73) Assignee: SANGWHA CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/868,006

(22) Filed: May 6, 2020

(65) Prior Publication Data
US 2020/0265652 A1    Aug. 20, 2020

Related U.S. Application Data

(63) Continuation-in-part of application No. 16/700,244, filed on Dec. 2, 2019, which is a continuation of
(Continued)

(30) Foreign Application Priority Data

Mar. 11, 2016  (KR) .......................... 10-2016-0029466
Sep. 26, 2016  (KR) .......................... 10-2016-0123261

(51) Int. Cl.
  *G06T 19/00*    (2011.01)
  *G06K 9/00*    (2006.01)
  (Continued)

(52) U.S. Cl.
  CPC ............ *G06T 19/006* (2013.01); *A63G 23/00* (2013.01); *A63G 31/02* (2013.01); *G06F 3/011* (2013.01); *G06K 9/00671* (2013.01)

(58) Field of Classification Search
  None
  See application file for complete search history.

(56) References Cited

U.S. PATENT DOCUMENTS

| | | | | |
|---|---|---|---|---|
| 5,060,932 A | * | 10/1991 | Yamaguchi | ............ A63G 31/16 434/34 |
| 5,489,212 A | * | 2/1996 | Yoshimoto | ............ A63G 31/16 434/34 |

(Continued)

FOREIGN PATENT DOCUMENTS

| CN | 104246853 A | 12/2014 |
|---|---|---|
| CN | 204926595 U | 12/2015 |

(Continued)

*Primary Examiner* — Jason A Pringle-Parker
(74) *Attorney, Agent, or Firm* — Novick, Kim & Lee, PLLC; Jae Youn Kim; Jihun Kim

(57) ABSTRACT

A virtual reality experience apparatus includes: a displaying device configured to provide an experiencing user with a virtual reality image; and a riding device configured to provide the experiencing user with a motion, wherein the riding device includes: a riding part providing the experiencing user with a ridable space, and a gyro mechanism generating a pitching motion and a rolling motion of the riding part, wherein the gyro mechanism includes: a base structure having a pair of support columns disposed apart from each other, a pitching mechanism rotatably mounted on the pair of support columns to be rotated with respect to a pitching axis extending between the pair of support columns, and a rolling mechanism rotatably mounted on the pitching mechanism to be rotated with respect to a rolling axis perpendicular to the pitching axis.

12 Claims, 36 Drawing Sheets

Related U.S. Application Data application No. 15/551,979, filed as application No. PCT/KR2017/002329 on Mar. 3, 2017, now Pat. No. 10,593,115.

(51) Int. Cl.
*A63G 31/02* (2006.01)
*A63G 23/00* (2006.01)
*G06F 3/01* (2006.01)

(56) References Cited

U.S. PATENT DOCUMENTS

| | | | |
|---|---|---|---|
| 5,702,307 A * | 12/1997 | Moran | A63G 31/16 472/130 |
| 5,725,435 A | 3/1998 | De Castro Faria | |
| 5,759,107 A * | 6/1998 | Nagel | A63G 31/16 434/55 |
| 6,017,276 A * | 1/2000 | Elson | A63G 31/16 434/29 |
| 7,172,511 B2 * | 2/2007 | Casey | A63G 7/00 104/53 |
| 7,383,747 B2 * | 6/2008 | Tippett | F03G 3/00 74/5.22 |
| 7,559,766 B2 * | 7/2009 | Epley | A61B 5/4863 434/34 |
| 8,066,576 B2 * | 11/2011 | Threlkel | A63G 7/00 104/53 |
| 8,579,714 B2 | 11/2013 | Trui et al. | |
| 9,764,176 B2 * | 9/2017 | Waterman | B01J 19/0046 |
| 9,789,411 B2 * | 10/2017 | Masutti | G09B 9/05 |
| 10,293,265 B1 * | 5/2019 | Freedman | A63G 31/16 |
| 2003/0125119 A1 * | 7/2003 | Jones | A63G 31/16 472/60 |
| 2006/0178221 A1 | 8/2006 | Threlkel | |
| 2007/0077540 A1 | 4/2007 | Testrake et al. | |
| 2009/0115232 A1 | 5/2009 | Dennis | |
| 2009/0126596 A1 | 5/2009 | Threlkel | |
| 2012/0312186 A1 | 12/2012 | Shasha et al. | |
| 2015/0020620 A1 | 1/2015 | Garner | |
| 2015/0231520 A1 * | 8/2015 | Striggow | G09F 19/02 446/233 |
| 2015/0269780 A1 | 9/2015 | Herman et al. | |
| 2016/0195923 A1 | 7/2016 | Nauseef et al. | |
| 2016/0293039 A1 | 10/2016 | Hosaka | |
| 2017/0080349 A1 | 3/2017 | Reveley | |

FOREIGN PATENT DOCUMENTS

| | | |
|---|---|---|
| DE | 19900528 A1 | 9/2000 |
| JP | S51-136777 U | 11/1976 |
| JP | S04-040691 U | 4/1992 |
| JP | H04-318888 A | 11/1992 |
| JP | H04-318889 A | 11/1992 |
| JP | 5092279 B2 | 12/2007 |
| KR | 1020150063205 A | 6/2015 |
| KR | 1020150117309 A | 10/2015 |

* cited by examiner

VIRTUAL REALITY EXPERIENCE APPARATUS CAPABLE OF PROVIDING EXPERIENCING USER WITH VIRTUAL REALITY IMAGE AND PHYSICAL MOTION

CROSS-REFERENCE TO RELATED APPLICATIONS

This application is a continuation-in-part of U.S. application Ser. No. 16/700,244, filed on Dec. 2, 2019, which is a continuation of a national stage application (U.S. application Ser. No. 15,551,979, filed on Aug. 18, 2017) of International Application No. PCT/KR2017/002329, filed on Mar. 3, 2017, which is incorporated herein by reference in its entirety, and additionally claims priorities from Korean Application No. 10-2016-0029466, filed on Mar. 11, 2016 and Korean Application No. 10-2016-0123261, filed on Sep. 26, 2016, which are also incorporated herein by references in their entireties.

TECHNICAL FIELD

The present invention relates to a virtual reality experience apparatus, and more particularly, to a virtual reality experience apparatus capable of providing an image and a physical motion.

BACKGROUND ART

Generally, virtual reality (VR) means an interface between humans and a computer, which creates a specific environment or situation using the computer to allow an experiencing user to feel as if he/she really interacts with the surrounding situation or environment.

Such a virtual reality is also called artificial reality, cyberspace, a virtual world, a virtual environment, a synthetic environment, an artificial environment, or the like.

A purpose of the virtual reality is to make people view and operate as if they are actually in an environment that people have little opportunity to experience in daily life without directly experiencing the environment. Recently, the virtual reality has been applied in fields of education, high-level programming, a remote control, and the like.

Korean Utility Model Publication No. 0342223 discloses an existing virtual reality experience apparatus.

However, such an existing virtual reality experience apparatus has a problem of deteriorating a sense of realism. More specifically, the existing virtual reality experience apparatus provides an experiencing user with only images, thus there is a problem in that a stimulus sensed by the experiencing user through a sense of sight and a stimulus sensed through a physical motion do not coincide with each other. Meanwhile, there has been an attempt to provide the experiencing user with a physical motion together with an image, but there is a problem in that a motion shown in the image and a motion that is actually provided do not coincide with each other. Further, the existing virtual reality experience apparatus has a problem in that an actual visual field of the experiencing user and a visual field of an image do not coincide with each other. Accordingly, the experiencing user may feel a sense of displacement, and an immersion level may be decreased, as a result, a sense of realism may deteriorate.

DETAILED DESCRIPTION OF THE INVENTION

Technical Problem

An object of the present invention is to provide a virtual reality experience apparatus capable of improving a sense of realism.

Technical Solution

According to one embodiment, a virtual reality experience apparatus includes: a displaying device configured to provide an experiencing user with a virtual reality image; and a riding device configured to provide the experiencing user with a motion, wherein the riding device includes: a riding part providing the experiencing user with a ridable space, and a gyro mechanism generating a pitching motion and a rolling motion of the riding part, wherein the gyro mechanism includes: a base structure having a pair of support columns disposed apart from each other, a pitching mechanism rotatably mounted on the pair of support columns to be rotated with respect to a pitching axis extending between the pair of support columns, and a rolling mechanism rotatably mounted on the pitching mechanism to be rotated with respect to a rolling axis perpendicular to the pitching axis.

The pitching mechanism includes a cross frame structure in which both end portions thereof are mounted on the pair of support columns.

The cross frame structure includes: a support bar portion extending in parallel with the pitching axis and on which the rolling mechanism is mounted; a pair of extending portions extended in a different direction from the longitudinal direction of the support bar portion from two ends of the support bar portion; and a pair of rotational axis portions extended from the pair of extending portions to be disposed in parallel with the longitudinal direction of the support bar portion.

The rolling mechanism includes: a support structure to which the riding part is fixedly coupled; and a rotational axis portion extended in a perpendicular direction from the support structure to be rotatably connected to the support bar portion.

The pitching mechanism further includes a pitching motor disposed in one of the support columns of the base structure to be connected with a corresponding rotational axis portion of the cross frame structure, wherein the pitching motor is a slip ring motor.

The rolling mechanism further includes a rolling motor disposed on the support bar portion of the pitching mechanism to be connected with a rotational axis portion of the rolling mechanism, wherein the rolling motor is a slip ring motor.

The displaying device is a head mount display (HMD) mounted on a head of the experiencing user, or a display disposed in front of the riding part.

The virtual reality experience apparatus further comprises a common screen configured to provide a non-experiencing user with the same virtual reality image.

The displaying device provides an image corresponding to a visual field of the experiencing user extracted from an omnidirectional image of the virtual reality image, wherein the visual field is corrected in a manner that a motion of the riding device is excluded from a motion of the displaying device.

In another embodiment, the virtual reality experience apparatus further comprises: a controller configured to calculate the visual field, wherein the controller subtracts a measured value of a motion of the riding device from a measured value of a motion of the displaying device, and calculates the visual field based on a resulting value obtained by the subtraction.

In still another embodiment, the virtual reality experience apparatus further comprises: a controller configured to control the displaying device and the riding device, wherein the controller generates a time stamp code specifying a plurality of points in time included in an experiencing time from an experience start point to an experience end point as multiple time stamps, and synchronizes the virtual reality image with a motion of the riding device using the time stamp code.

The controller comprises: an editor configured to generate the time stamp code; an image controller configured to control the displaying device; and a driving controller configured to control a driving apparatus, wherein the editor generates the virtual reality image changing as time passes, generates the time stamp code specifying the plurality of points in time as first to n-th time stamps, generates a first database specifying first to n-th images respectively reproduced at the first to n-th time stamps, and generates a second database specifying first to n-th motions respectively carried out at the first to n-th time stamps, and wherein the controller sequentially transmits the first to n-th time stamps at a predetermined time interval once an experience starts simultaneously to the image controller and the driving controller.

The image controller applies a time stamp received from the controller to the first database to select an image corresponding to the received time stamp among the first to n-th images and transmits the selected image to the displaying device, and wherein the driving controller applies the time stamp received from the controller to the second database to select a motion corresponding to the received time stamp among the first to n-th motions and transmits the selected motion to the riding device.

The image controller compares a target image and an actual image at a predetermined frequency interval and makes the target image and the actual image coincide with each other, and the driving controller compares a target motion and an actual motion at a predetermined time interval and makes the target motion and the actual motion coincide with each other.

Accordingly, the experiencing user may be prevented from feeling a sense of displacement, and an immersion level may be improved, as a result, a sense of realism may be improved.

DETAILED DESCRIPTION

Hereinafter, a virtual reality experience apparatus according to the present invention will be described in detail with reference to the accompanying drawings.

Figure 1:
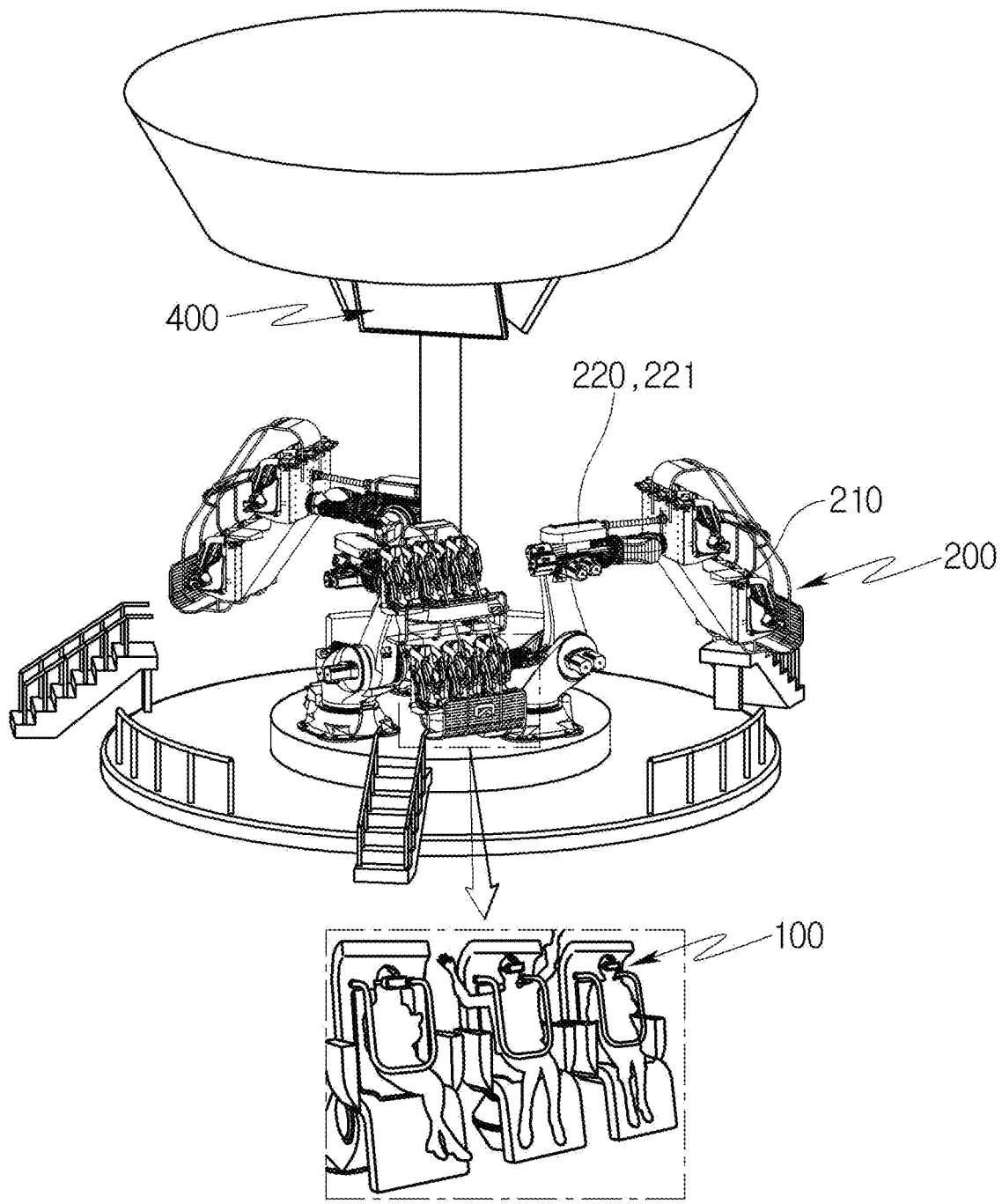
FIG. 1 is a perspective view illustrating a virtual reality experience apparatus according to an embodiment of the present invention.
Figure 2:
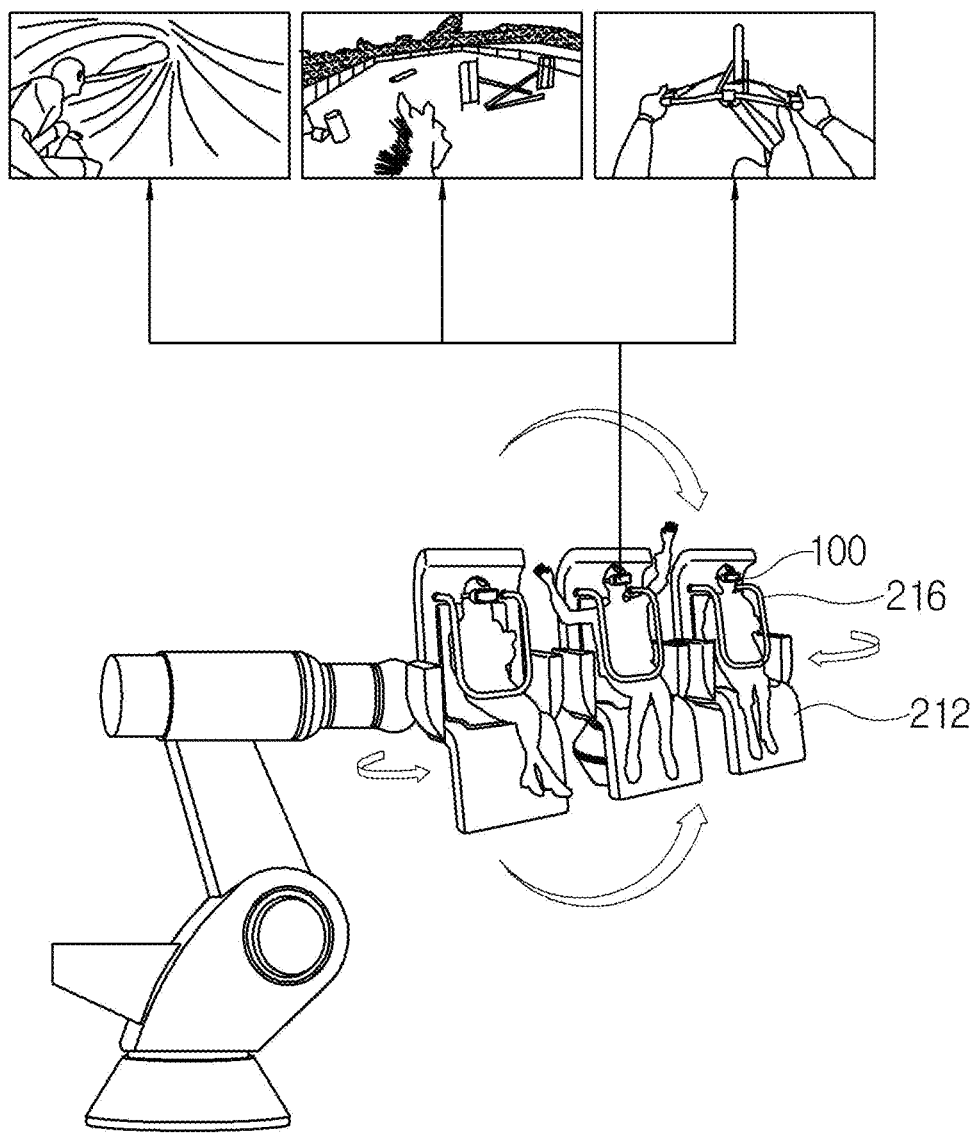
FIG. 2 is a perspective view illustrating an image and a motion provided by the virtual reality experience apparatus of FIG. 1.
Figure 3:
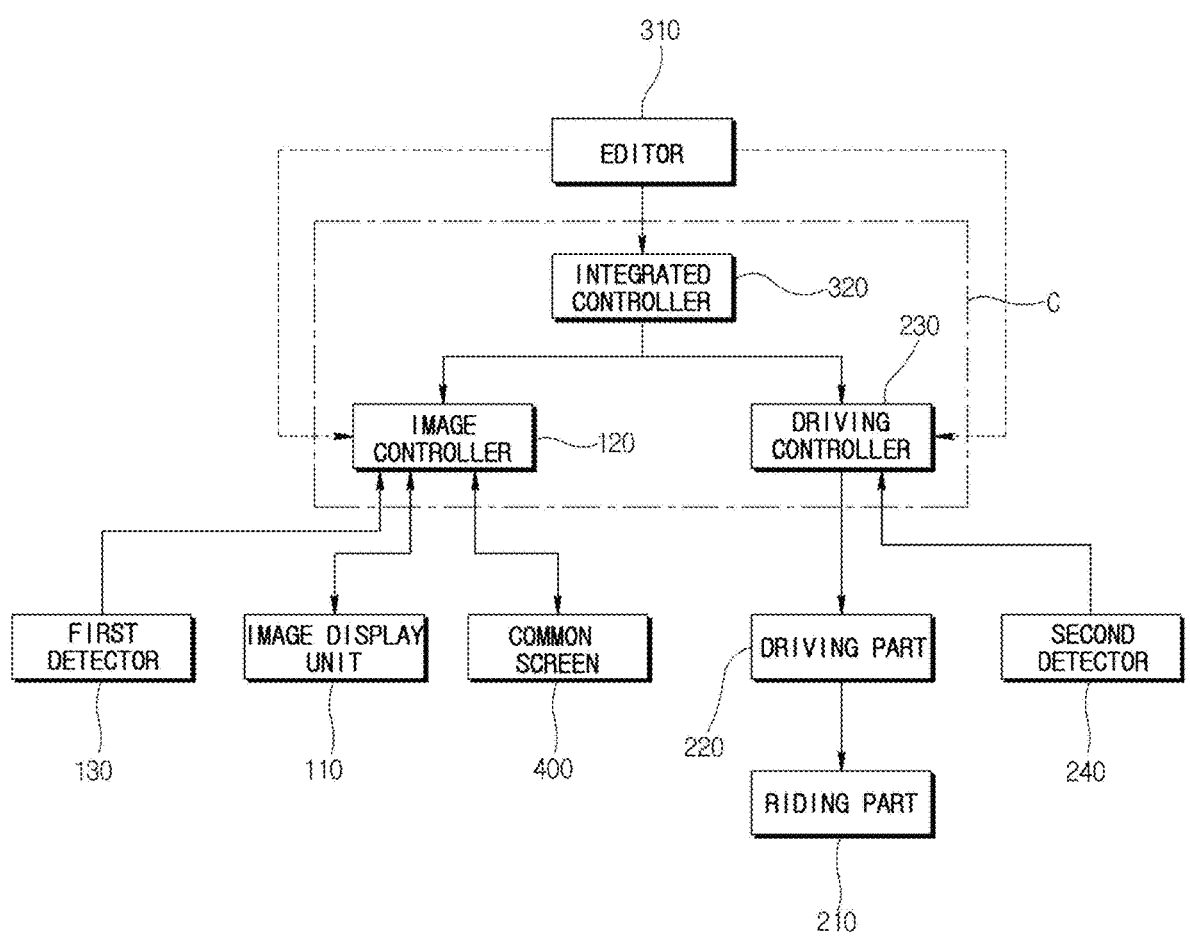
FIG. 3 is a schematic diagram illustrating components of the virtual reality experience apparatus of FIG. 1.
Figure 4:
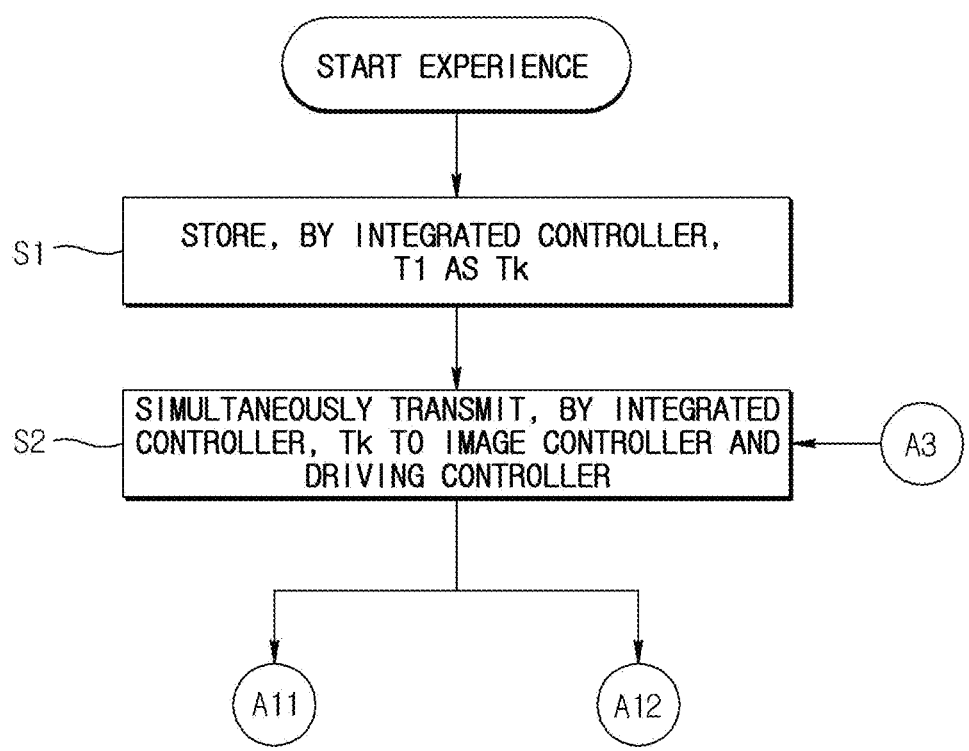
FIG. 4 is a flowchart illustrating part of a first control method for the virtual reality experience apparatus of FIG. 1.
Figure 5:
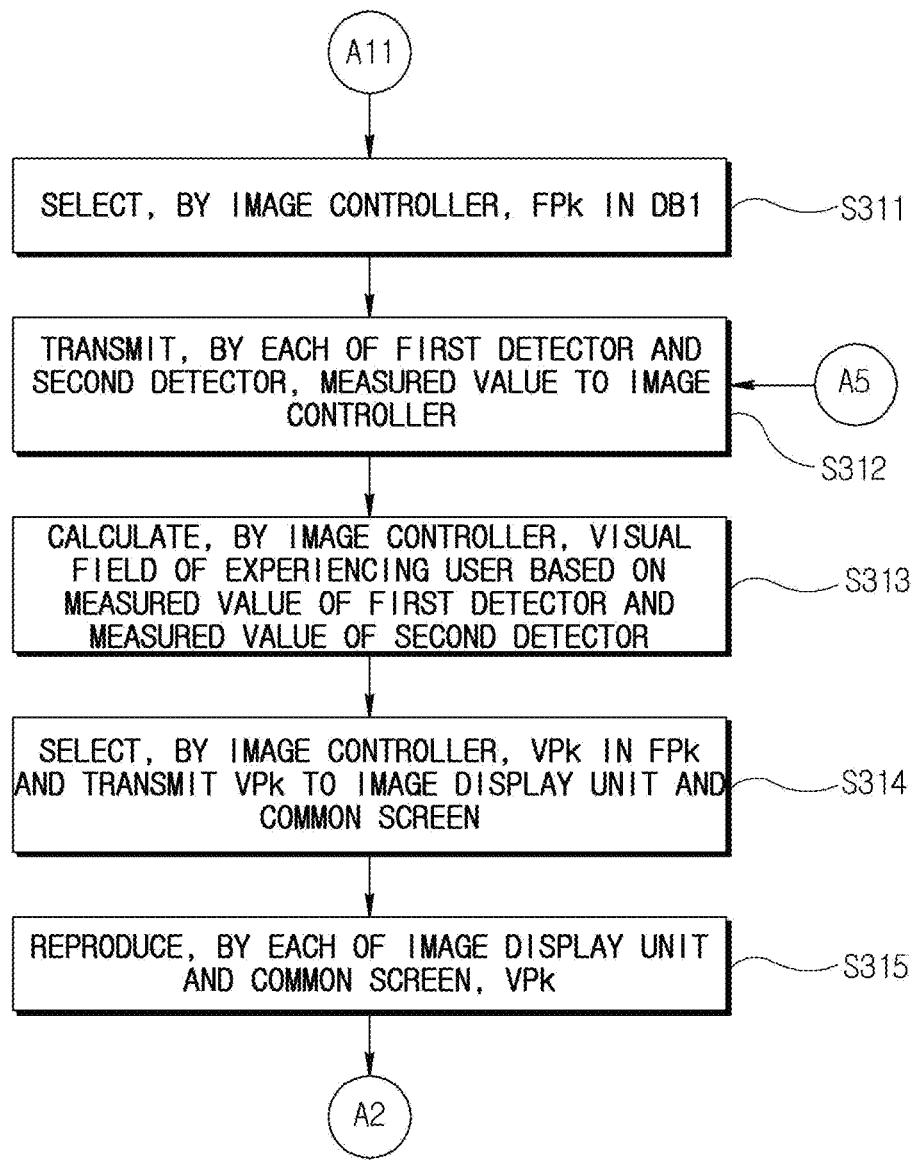
FIG. 5 is a flowchart illustrating another part of the first control method of FIG. 4.
Figure 6:
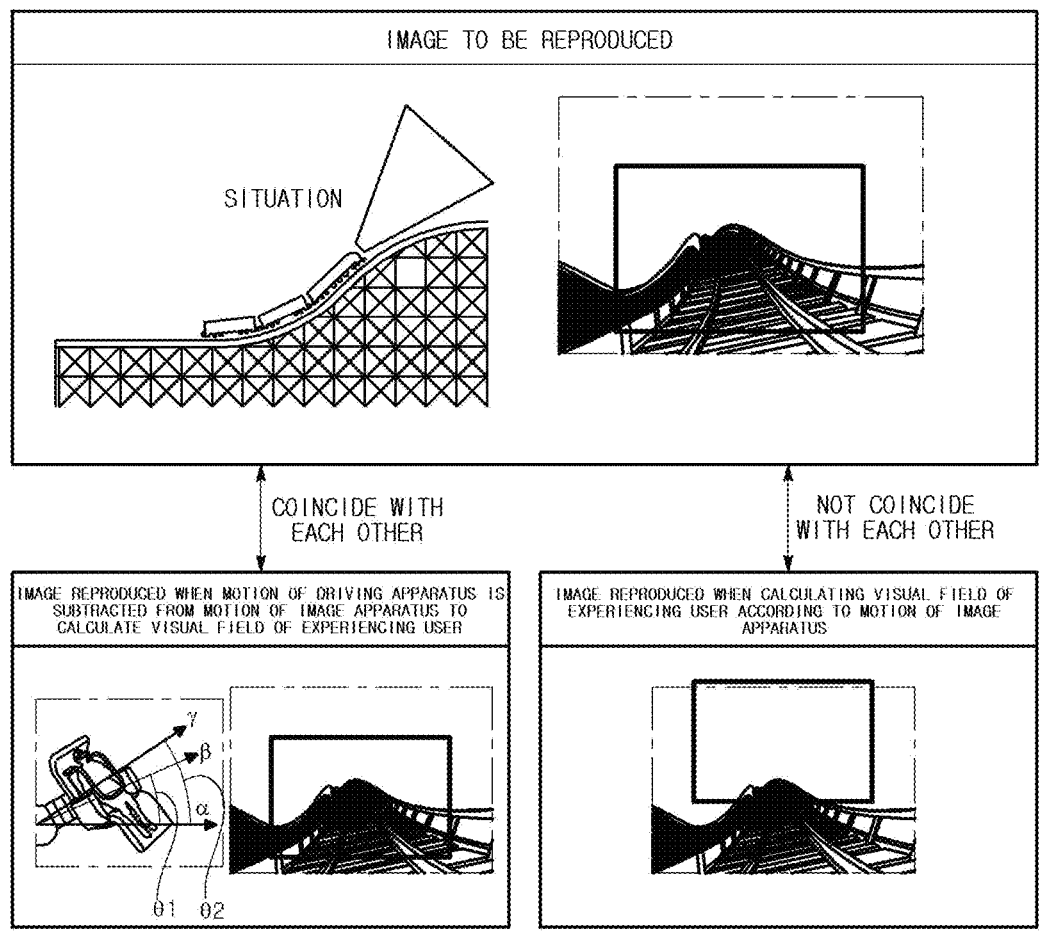
FIG. 6 is a diagram for describing a concept of visual calculation in FIG. 5.
Figure 7:
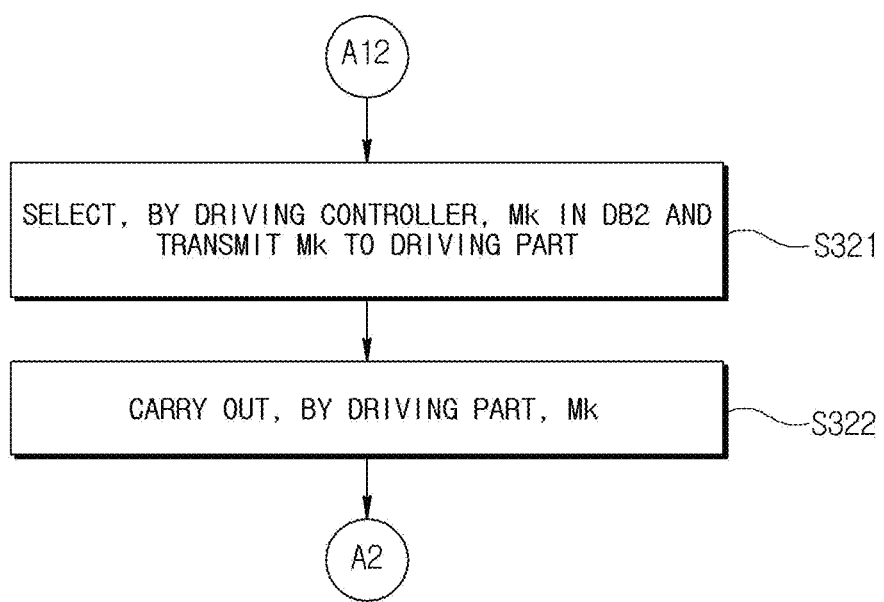
FIGS. 7 to 10 are flowcharts each illustrating still another part of the first control method of FIG. 4.

FIG. 1 is a perspective view illustrating a virtual reality experience apparatus according to an embodiment of the present invention, FIG. 2 is a perspective view illustrating an image and a motion provided by the virtual reality experience apparatus of FIG. 1, and FIG. 3 is a schematic diagram illustrating components of the virtual reality experience apparatus of FIG. 1. FIG. 4 is a flowchart illustrating part of a first control method for the virtual reality experience apparatus of FIG. 1, FIG. 5 is a flowchart illustrating another part of the first control method of FIG. 4, FIG. 6 is a diagram for describing a concept of visual calculation in FIG. 5, which illustrates a difference depending on whether a visual field is corrected when an experiencing user is moved upward in a state in which the experiencing user casts a gaze downward, and FIGS. 7 to 10 are flowcharts each illustrating still another part of the first control method of FIG. 4. Meanwhile, FIG. 11 is a flowchart illustrating part of a second control method for the virtual reality experience apparatus of FIG. 1. Further, FIGS. 12 to 19 are flowcharts each illustrating part of a third control method for the virtual reality experience apparatus of FIG. 1.

Referring to FIGS. 1 to 3, a virtual reality experience apparatus according to an embodiment of the present invention may include an image apparatus 100 providing an experiencing user with a virtual reality image, a riding apparatus 200 providing the experiencing user with a physical motion, and a control apparatus (not illustrated) controlling the image apparatus 100 and the riding apparatus 200. Hereinafter, the virtual reality image provided to the experiencing user will be referred to as an experienced image, and the physical motion provided to the experiencing user will be referred to as an experienced motion.

The image apparatus 100 is to allow the experiencing user to visually experience virtual reality, and may include an image display unit 110 showing the experienced image and an image controller 120 controlling the image display unit 110. Here, the image controller 120 is included in the image apparatus 100 in the present embodiment, but may also be included in the control apparatus (not illustrated).

Meanwhile, the image apparatus 100 may be configured in a manner that as the experienced image, an image corresponding to a visual field of the experiencing user in an image surrounding the experiencing user (hereinafter, referred to as an omnidirectional image) FPk is provided, such that the experiencing user may view the image that makes the experiencing user feel as if the experiencing user is in an actual environment (hereinafter, referred to as a visual-field-corresponding image providing manner) as illustrated in FIG. 2. That is, the experienced image is formed by the omnidirectional image FPk, and may be formed so that the visual-field-corresponding image VPk that corresponds to a specific portion (a portion to which a gaze of the experiencing user is directed) of the omnidirectional image FPk is shown in the image display unit 110.

Specifically, the image apparatus 100 is configured by, for example, a head mount display (HMD) device mounted on a head of the experiencing user, and may further include a first detector 130 detecting a motion of the image apparatus 100. Here, the first detector 130 may be configured by, for example, a gyro sensor, an acceleration sensor, and the like.

Further, the image apparatus 100 may be configured so that the omnidirectional image FPk is stored in the image controller 120, a measured value (a motion of the image apparatus 100 detected through the first detector 130) of the first detector 130 is periodically transmitted to the image controller 120, the image controller 120 calculates a visual field of the experiencing user based on the measured value of the first detector 130, the image controller 120 transmits the image corresponding to the calculated visual field of the experiencing user in the omnidirectional image FPk to the image display unit 110, and the image display unit 110 displays the image received from the image controller 120.

Meanwhile, the motion of the image apparatus 100 detected through the first detector 130 may be affected by a motion (experienced motion) of the riding apparatus 200 in addition to a change in a gaze of the experiencing user. For example, even in a case in which the riding apparatus 200 moves upward, and the experiencing user keeps the gaze forward, the first detector 130 may detect that the image apparatus 100 moves upward. Therefore, in a case where the experiencing user changes the gaze in a state in which the riding apparatus 200 does not move, a motion of the image apparatus 100 detected through the first detector 130 coincides with a motion of the image apparatus 100 resulting from the gaze change of the experiencing user, such that a visual field of the experiencing user calculated from the measured value of the first detector 130 may coincide with an actual visual field of the experiencing user. However, in a case in which the riding apparatus 200 moves, a motion of the image apparatus 100 detected through the first detector 130 does not coincide with a motion of the image apparatus 100 resulting from the gaze change of the experiencing user, such that a visual field of the experiencing user calculated from the measured value of the first detector 130 may not coincide with an actual visual field of the experiencing user.

Considering this, in the present embodiment, the image apparatus 100 may be configured in a manner (hereinafter, visual field correction manner) that a motion of the image apparatus 100 by a motion (experienced motion) of the riding apparatus 200 is excluded when calculating a visual field of the experiencing user. That is, the riding apparatus 200 includes a second detector 240 detecting a motion (experienced motion) of the riding apparatus 200, and the image controller 120 of the image apparatus 100 may be configured to subtract a measured value (a motion of the image apparatus resulting from the motion of the riding apparatus 200) of the second detector 240 from a measured value of the first detector 130, and calculate a visual field of the experiencing user based on a value ($\theta1-\theta2$) obtained by the subtraction (a motion of the image apparatus resulting from the change in the visual field of the experiencing user).

Specifically, if an angle from a reference vector $\alpha$ (e.g. a vector directed to a front of the experiencing user at an experience start point in time) to a vector $\beta$ in a direction of a gaze of the experiencing user is a first angle $\theta1$, and an angle from reference vector $\alpha$ to a vector $\gamma$ directed to a front of the experiencing user at a detection point in time (a normal vector of a back of a chair 212 included in a riding part 210 to be described later) is a second angle $\theta2$, the first detector 130 may detect the first angle $\theta1$ and transmit the detected angle to the image controller 120, the second detector 240 may detect the second angle $\theta2$ and transmit the detected angle to the image controller 120, and the image controller 120 may subtract the second angle $\theta2$ from the first angle $\theta1$ and calculate a visual field of the experiencing user based on a value ($\theta1-\theta2$) obtained by the subtraction. By doing so, as illustrated in FIG. 6, an image corresponding to an actual visual field of the experiencing user may be provided.

Here, the second detector 240 may be configured by a gyro sensor, an acceleration sensor, and the like installed in the riding part 210 to be described later, or may also be configured in a robot sensor interface (RSI) scheme that may sense a motion of each joint of a robot arm 221 to be described later to calculate a motion of the riding part 210.

The riding apparatus 200 is to allow the experiencing user to experience virtual reality through a physical motion, and may include the riding part 210 providing the experiencing user with a ridable space, a driving part 220 providing the experienced motion by linearly moving or rotating the riding part 210, and a driving controller 230 controlling the driving part 220. Here, the driving controller 230 is included in the riding apparatus 200 in the present embodiment, but may also be included in the control apparatus (not illustrated).

The riding part 210 may include a chair 212 on which the experiencing user may seat, a safety belt 214 for preventing the experiencing user from being separated from the chair 212, and a handle 216 that the experiencing user may grip for securing psychological stability of the experiencing user.

Further, the riding part 210 may further include a holder (not illustrated) on which the image apparatus 100 may detachably seated, a separation preventing means (not illustrated) for preventing the image apparatus 100 from being separated from the holder (not illustrated) further away than a predetermined separation distance, a power cable (not illustrated) for supplying power to the image apparatus 100 side from the holder (not illustrated), and the like.

The driving part 220 may be configured to provide the experiencing user with a physical motion that allows the experiencing user to feel as if the experiencing user rides an actual mechanism with relatively less space constraints. That is, a motion displayed in the experienced image is not provided through an actual mechanism, but may be provided by the driving part 220 operated within a predetermined restricted space narrower than a space in which the actual mechanism is operated.

The driving part 220 as described above may be variously configured so as to three-dimensionally move the riding part 210, and in the present embodiment, may be configured by the robot arm 221 including a plurality of arms and joints to be able to move with a plurality of degrees of freedom (e.g. 6 degrees of freedom). In this case, the riding part 210 may be detachably coupled to a free end of the robot arm 221.

Here, the number of riding parts 210 and the number of driving parts 220 may be appropriately adjusted. That is, one riding part 210 may be coupled to one driving part 220 to provide virtual reality experience to one experiencing user at a time. Alternatively, a plurality of riding parts 210 may be coupled to one driving part 220 to provide virtual reality experience to several experiencing users at a time thereby improving a turnover ratio. Alternatively, in order to further improve a turnover ratio, a plurality of driving parts 220 may be provided, and at least one riding part 210 may be coupled to each driving part 220. That is, the virtual reality experience apparatuses may be provided in plural. In this case, the plurality of virtual reality experience apparatuses may each independently provide the experienced image and the experienced motion, thereby simultaneously providing multiple kinds of virtual reality.

The control apparatus (not illustrated) may be configured by a server or a computer electrically connected to the image apparatus 100 and the riding apparatus 200, and may include an editor 310 to be described later 310, and at least a part (in the present embodiment, an integrated controller 320 to be described later) of a controller C to be described later.

Meanwhile, the virtual reality experience apparatus according to the present embodiment may further include a common screen 400 providing a non-experiencing person with a virtual reality image for promotion and attracting experiencing users. In this case, the image controller 120 may be configured to control the image display unit 110 and the common screen 400.

The virtual reality experience apparatus according to such configuration may be configured to be operable by a first control method illustrated in FIGS. 4 to 10.

That is, the virtual reality experience apparatus may not only be configured to provide the experienced image in the visual-field-corresponding image providing manner and the visual field correction manner as described above, but also be configured so that the experienced image and the experienced motion to be provided at every instant during an experiencing time from an experience start point in time to an experience end point in time are set in advance, the experienced image and the experienced motion that are set in advance are sequentially provided, and the experienced image and the experienced motion are synchronized with each other. Here, the synchronization means that an imaginal motion (visual motion) shown in the experienced image and the experienced motion (physical motion) coincide with each other.

In detail, in a case in which the experienced image and the experienced motion are not synchronized with each other, if, for example, an image showing a descent is provided by the image apparatus 100 while an ascending motion is provided by the rising apparatus 200, the experiencing user may feel a sense of displacement, and an immersion level may be decreased, as a result, a sense of realism may deteriorate.

Considering this, the virtual reality experience apparatus according to the present embodiment may be configured to synchronize the experienced image and the experienced motion before experience through the editor 310 forming (specifying) the experienced image and the experienced motion, and synchronize the experienced image and the experienced motion during experience through the controller C controlling the image apparatus 100 (more precisely, the image display unit 110) and the riding apparatus 200 (more precisely, the driving part 220) based on the experienced image and the experienced motion formed (specified) by the editor 310.

More specifically, the editor 310 as software provided in the control apparatus (not illustrated) may form a time stamp code (TC) specifying a plurality of points in time included in the experiencing time from the experience start point in time to the experience end point in time as first to n-th time stamps T1 to Tn, form a first database DB1 specifying first to n-th images (FP1 to FPn) which are experienced images to be each reproduced at the first to n-th time stamps T1 to Tn, and form a second database DB2 specifying first to n-th motions M1 to Mn which are experienced motions to be each carried out at the first to n-th time stamps T1 to Tn.

Here, the time stamp code TC may be stored in the integrated controller 320 to be described later, the first database DB1 may be stored in the image controller 120, and the second database DB2 may be stored in the driving controller 230.

The controller C may be configured of the image controller 120, the driving controller 230, and the integrated controller 320 for controlling the image controller 120 and the driving controller 230. Here, the integrated controller 320 may be provided in the control apparatus (not illustrated).

The integrated controller 320 may be configured to sequentially transmit the first to n-th time stamps T1 to Tn to the image controller 120 and the driving controller 230 at a predetermined time interval (e.g. 10 ms) once the experience starts, based on the time stamp code TC.

Here, the integrated controller 320 may be configured to simultaneously transmit any time stamp Tk of the first to n-th time stamps T1 to Tn to the image controller 120 and the driving controller 230 for synchronization during the experience.

The image controller 120 may be configured to apply the time stamp Tk received from the integrated controller 320 to the first database DB1 to select an image FPk corresponding to the received time stamp Tk among the first to n-th images FP1 to FPn, and transmit a visual-field-corresponding image VPk in the selected image FPk to the image display unit 110. In this case, according to the present embodiment, the image controller 120 may be configured to transmit image VPk that is transmitted to the image display unit 110, to the common screen 400 as well.

Further, the image controller 120 may be configured to compare a target image with an actual image at a predetermined frequency interval (e.g. 60 Hz) and make the target image and the actual image coincide with each other, for synchronization during experience.

Specifically, the image controller 120 may be configured to compare an actual time stamp Tk' that is a time stamp corresponding to the image transmitted to the image display unit 110 with a target time stamp Tk that is a time stamp Tk received from the integrated controller 320. Here, by comparing time stamps, rather than directly comparing image data, a burden applied to the image controller 120 may be reduced, and a processing speed of the image controller 120 may be improved.

Further, if the actual time stamp Tk' is a point in time earlier than the target time stamp Tk, the image controller 120 may instruct the image display unit 110 to reproduce images between the image corresponding to the actual time stamp Tk' and an image corresponding to the target time stamp Tk at a reproduction speed faster than a predetermined reproduction speed.

Further, if the actual time stamp Tk' is a point in time later than the target time stamp Tk, the image controller 120 may instruct the image display unit 110 to reproduce images subsequent to the image corresponding to the actual time stamp Tk' at a reproduction speed slower than the predetermined reproduction speed.

Alternatively, if the actual time stamp Tk' is a point in time later than the target time stamp Tk, the image controller 120 may instruct the image display unit 110 to repeatedly reproduce the image corresponding to the actual time stamp Tk'.

The driving controller 230 may be configured to apply the time stamp Tk received from the integrated controller 320 to the second database DB2 to select a motion Mk corresponding to the received time stamp Tk among the first to n-th motions M1 to Mn, and transmit the selected motion Mk to the driving part 220.

Further, the driving controller 230 may be configured to compare a target motion with an actual motion at a predetermined time interval (e.g. 12 ms) and make the target motion and the actual motion coincide with each other, for synchronization during experience.

Specifically, the driving controller 230 may be configured to compare an actual time stamp Tk" that is a time stamp corresponding to the actual motion carried out by the driving part 220 with a target time stamp Tk that is a time stamp Tk received from the integrated controller 320. Here, by comparing time stamps, rather than directly comparing motion data, a burden applied to the driving controller 230 may be reduced, and a processing speed of the driving controller 230 may be improved.

Further, if the actual time stamp Tk" is a point in time earlier than the target time stamp Tk, the driving controller 230 may instruct the driving part 220 to carry out motions between the motion corresponding to the actual time stamp Tk" and a motion corresponding to the target time stamp Tk at a driving speed faster than a predetermined driving speed.

Further, if the actual time stamp Tk" is a point in time later than the target time stamp Tk, the driving controller 230 may instruct the driving part 220 to carry out the motions subsequent to the motion corresponding to the actual time stamp Tk" at a driving speed slower than the predetermined driving speed.

Here, the driving controller 230 may be configured to calculate the actual time stamp Tk" by using the second database DB2. Specifically, the measured value of the second detector 240 that is detected at a predetermined time interval (e.g. 12 ms) is transmitted to the driving controller 230, and the driving controller 230 may be configured to apply the measured value of the second detector 240 to the second database DB2 to calculate a time stamp corresponding to the measured value of the second detector 240 as the actual time stamp Tk". In this case, a burden applied to the driving controller 230 may be somewhat increased, but since there is no need to add a separate apparatus for calculating the actual time stamp Tk", costs may be reduced.

Alternatively, the driving controller 230 may also be configured to include a timer (not illustrated) counting a time for which the driving part 220 is operated, and calculate a time of the timer (not illustrated) extracted at a predetermined time interval (e.g. 12 ms) as the actual time stamp Tk". In this case, although costs may be somewhat increased as a separate apparatus (timer (not illustrated)) for calculating the actual time stamp Tk" is added, a burden applied to the driving controller 230 may be decreased.

Hereinafter, the first control method will be described.

That is, the first control method may include an editing step of editing the experienced image and the experienced motion before experience, and a carrying out step of carrying out the experience.

In the editing step, the editor 310 forms the time stamp code TC, the first database DB1, and the second database DB2, the time stamp code TC may be stored in the integrated controller 320, the first database DB1 may be stored in the image controller 120, and the second database DB2 may be stored in the driving controller 230.

In the carrying out step, once an experiencing user gets on the riding apparatus 200, and the image apparatus 100 is mounted on a head of the experiencing user, the experience may start.

Once the experience starts, in a first step (S1), the integrated controller 320 may store a first time stamp T1 which is an initial time stamp as a target time stamp Tk.

Next, in a second step (S2), the integrated controller 320 may simultaneously transmit the target time stamp Tk stored in the integrated controller 320 to the image controller 120 and the driving controller 230.

Next, in a 3-1-1-th step (S311), the image controller 120 may apply the target time stamp Tk received through the second step (S2) to the first database DB1 to select an image (omnidirectional image) FPk corresponding to the target time stamp Tk among the first to n-th images (omnidirectional image) FP1 to FPn.

Next, in a 3-1-2-th step (S312), the first detector 130 may transmit a measured value of the first detector 130 to the image controller 120, and the second detector 240 may transmit a measured value of the second detector 240 to the image controller 120.

Next, in a 3-1-3-th step (S313), the image controller 120 may calculate a visual field of the experiencing user based on the measured value of the first detector 130 and the measured value of the second detector 240.

Next, in a 3-1-4-th step (S314), the image controller 120 may select an image (visual-field-corresponding image) VPk corresponding to the visual field of the experiencing user that is calculated in the 3-1-3-th step (S313) in the image (omnidirectional image) FPk selected in the 3-1-1-th step (S311) to transmit the selected image to the image display unit 110 and the common screen 400.

Next, in a 3-1-5-th step (S315), the image display unit 110 and the common screen 400 may each reproduce the image VPk received through the 3-1-4-th step (S314).

Here, the common screen 400 is configured to provide non-experiencing people with the same image as the image VPk shown in the image display unit 110, but is not limited thereto. The common screen 400 may also be configured to provide the non-experiencing people with an image different from the image VPk shown in the image display unit 110 as in a third control method to be described later in order to solve a problem concerning an image of which experiencing user the common screen 400 reproduces in a case in which there are a plurality of experiencing users, or the common screen 400 itself may also be omitted in order to reduce a time and costs consumed for operating the common screen 400.

Meanwhile, in a 3-2-1-th step (S321), the driving controller 230 may apply the target time stamp Tk received through the second step (S2) to the second database DB2 to select a motion Mk corresponding to the target time stamp Tk among the first to n-th motions M1 to Mn, and transmit the selected motion Mk to the driving part 220.

Next, in a 3-2-2-th step (S322), the driving part 220 may carry out the motion received through the 3-2-1-th step (S321).

Meanwhile, when at least one of the 3-1-4-th step (S314) and the 3-2-2-th step (S322) ends, in a fourth step (S4), the integrated controller 320 may determine whether the experience ends. That is, the integrated controller 320 may determine whether the target time stamp Tk stored in the integrated controller 320 coincides with the n-th time stamp Tn which is a final time stamp.

Further, if it is determined in the fourth step (S4) that the experience ends (if the target time stamp Tk coincides with the n-th time stamp Tn), the experience ends, and if it is determined that the experience is being carried out (if the target time stamp Tk does not coincide with the n-th time stamp Tn), the method may proceed to a fifth step (S5) to be described later.

In the fifth step (S5), the integrated controller 320 may determine whether a predetermined time (interval between time stamps) has elapsed after the target time stamp Tk is transmitted in the second step (S2).

Further, if it is determined in the fifth step (S5) that the predetermined time has elapsed, the method proceeds to a sixth step (S6) to be described later, and if it is determined that the predetermined time has not elapsed, the method may simultaneously proceed to a 7-1-1-th step (S711) and a 7-2-1-th step (S721) to be described later.

In the sixth step (S6), the integrated controller 320 may store a time stamp subsequent to the time stamp stored as the target time stamp Tk up to now as a new target time stamp Tk. For example, if the time stamp stored as the target time stamp Tk up to now is the first time stamp T1, the second time stamp T2 may be stored as a new target time stamp Tk.

Further, after the sixth step (S6) ends, the method may return to the second step (S2).

In the 7-1-1-th step (S711), the image controller 120 may calculate the actual time stamp Tk'.

Then, in the 7-1-2-th step (S712), the image controller 120 may determine whether the actual time stamp Tk' calculated in the 7-1-1-th step (S711) coincides with the target time stamp Tk received through the second step (S2).

Further, if it is determined in the 7-1-2-th step (S712) that the target time stamp Tk coincides with the actual time stamp Tk', the method returns to the 3-1-2-th step (S312), and if it is determined that the target time stamp Tk does not coincide with the actual time stamp Tk', the method may proceed to a 7-1-3-th step (S713) to be described later.

In the 7-1-3-th step (S713), the image controller 120 may determine whether the actual time stamp Tk' is a point in time earlier than the target time stamp Tk.

Further, if it is determined in the 7-1-3-th step (S713) that the actual time stamp Tk' is a point in time earlier than the target time stamp Tk, the method proceeds to a 7-1-4-th step (S714) to be described later, and if it is determined that the actual time stamp Tk' is a point in time later than the target time stamp Tk, the method may proceed to a 7-1-5-th step (S715) to be described later.

In the 7-1-4-th step (S714), the image controller 120 may instruct the image display unit 110 to reproduce images between an image corresponding to the actual time stamp Tk' and an image corresponding to the target time stamp Tk at a reproduction speed faster than a predetermined reproduction speed.

Once the 7-1-4-th step (S714) ends, the method may return to the 3-1-2-th step (S312).

In the 7-1-5-th step (S715), the image controller 120 may instruct the image display unit 110 to reproduce images subsequent to the image corresponding to the actual time stamp Tk' at a reproduction speed slower than the predetermined reproduction speed. Alternatively, the image controller 120 may instruct the image display unit 110 to repeatedly reproduce the image corresponding to the actual time stamp Tk'.

Once the 7-1-5-th step (S715) ends, the method may return to the 3-1-2-th step (S312).

Here, the 7-1-1-th to 7-1-5-th steps (S711 to S715) may be carried out at a predetermined frequency interval (e.g. 60 Hz).

Further, when it is determined in the 7-1-2-th step (S712) that the target time stamp Tk coincides with the actual time stamp Tk', or when the 7-1-4-th step (S714) ends or the 7-1-5-th step (S715) ends, the method returns to the 3-1-2-th step (S312) in order to reflect a change in the visual field of the experiencing user in the meantime.

Meanwhile, in a 7-2-1-th step (S721), the second detector 240 may transmit a measured value (an actual motion of the driving part 220) of the second detector 240 to the driving controller 230.

Then, in a 7-2-2-th step (S722), the driving controller 230 may calculate an actual time stamp Tk" based on the measured value of the second detector 240 received through the 7-2-1-th step (S721), and determine whether the calculated actual time stamp Tk" coincides with the target time stamp Tk received through the second step (S2).

Further, if it is determined in the 7-2-2-th step (S722) that the target time stamp Tk coincides with the actual time stamp Tk", the method returns to the fifth step (S5), and if it is determined that the target time stamp Tk does not coincide with the actual time stamp Tk", the method may proceed to a 7-2-3-th step (S723) to be described later.

In a 7-2-3-th step (S723), the driving controller 230 may determine whether the actual time stamp Tk" is a point in time earlier than the target time stamp Tk.

Further, if it is determined in the 7-2-3-th step (S723) that the actual time stamp Tk" is a point in time earlier than the target time stamp Tk, the method proceeds to a 7-2-4-th step (S724) to be described later, and if it is determined that the actual time stamp Tk" is a point in time later than the target time stamp Tk, the method may proceed to a 7-2-5-th step (S725) to be described later.

In the 7-2-4-th step (S724), the driving controller 230 may instruct the driving part 220 to carry out motions between a motion corresponding to the actual time stamp Tk" and a motion corresponding to the target time stamp Tk at a driving speed faster than a predetermined driving speed.

Once the 7-2-4-th step (S724) ends, the method may return to the fifth step (S5).

In the 7-2-5-th step (S725), the driving controller 230 may instruct the driving part 220 to carry out motions subsequent to the motion corresponding to the actual time stamp Tk" at a driving speed slower than the predetermined driving speed.

Once the 7-2-5-th step (S725) ends, the method may return to the fifth step (S5).

Here, the 7-2-1-th to 7-2-5-th steps (S721 to S725) may be carried out at a predetermined time interval (e.g. 12 ms).

The carrying out step as described above may end after the first step (S1) is carried out once at the experience start point in time, and the second to 7-2-5-th steps (S2 to S725) are repeatedly carried out until an image and a motion corresponding to the final time stamp are provided.

Here, the virtual reality experience apparatus according to the present embodiment includes the image apparatus 100 and the riding apparatus 200, such that a stimulus sensed by the experiencing user through a sense of sight and a stimulus sensed through a physical motion may coincide with each other. Accordingly, the experiencing user may be prevented from feeling a sense of displacement, and an immersion level may be improved, as a result, a sense of realism may be improved.

Further, as the experienced image and the experienced motion are synchronized with each other, a stimulus sensed by the experiencing user through a sense of sight and a stimulus sensed through a physical motion may more coincide with each other.

Further, as the synchronization between the experienced image and the experienced motion are carried out in stages (before experience, experience start point in time, and during experience), and periodically carried out during the experience, a stimulus sensed by the experiencing user through a sense of sight and a stimulus sensed through a physical motion may more effectively coincide with each other.

Further, the image apparatus 100 is configured to provide the visual-field-corresponding image VPk in the omnidirectional image FPk, thereby more improving a sense of realism.

Further, as the image apparatus 100 is configured to exclude a motion of the riding apparatus 200 when calculating the visual field of the experiencing user, it is possible to prevent a case in which an actual visual field of the experiencing user and a visual field of the image do not coincide with each other by the motion of the riding apparatus 200.

Further, as the driving part 220 of the riding apparatus 200 is configured by the robot arm 221, it is possible to provide the experiencing user with a motion that allows the experiencing user to feel as if the experiencing user rides an actual mechanism with relatively less space constraints.

Meanwhile, the virtual reality experience apparatus may also be configured to be operable by a second control method illustrated in FIG. 11.

That is, the virtual reality experience apparatus may be configured to be practically the same as the case in which it is operable by the first control method, but may be configured so that the image controller 120 dose not serve to compare a target image and an actual image and make them coincide with each other, and the driving controller 230 does not serve to compare a target motion and an actual motion and make them to coincide with each other, such that synchronization is carried out only before the experience and at the experience start point in time.

Hereinafter, the second control method will be described.

Figure 8:
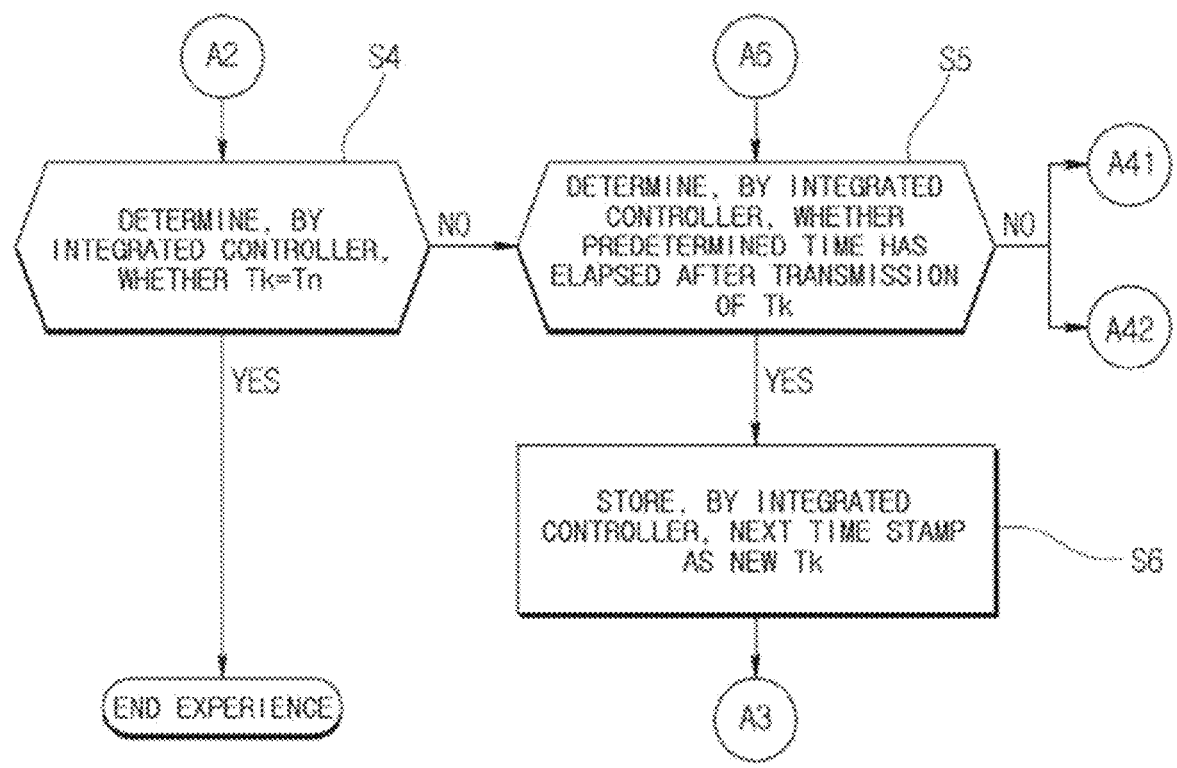
Figure 9:
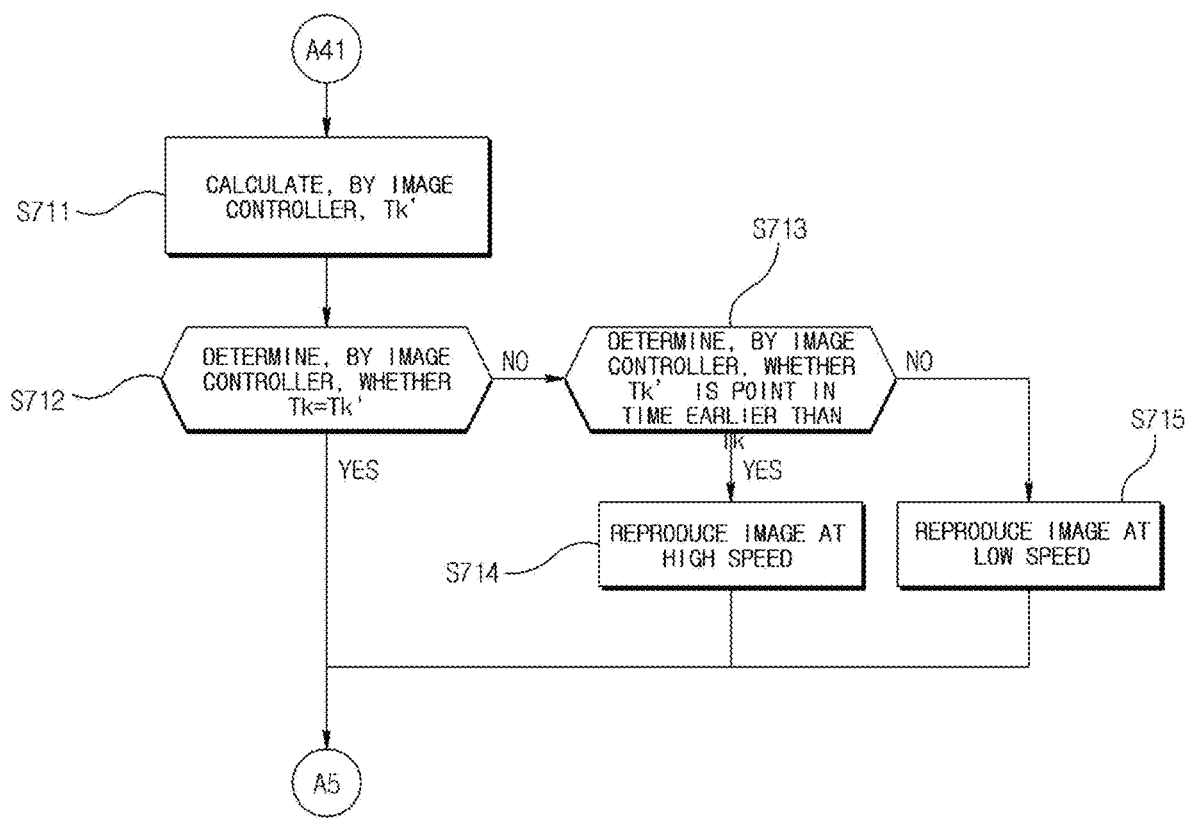
Figure 10:
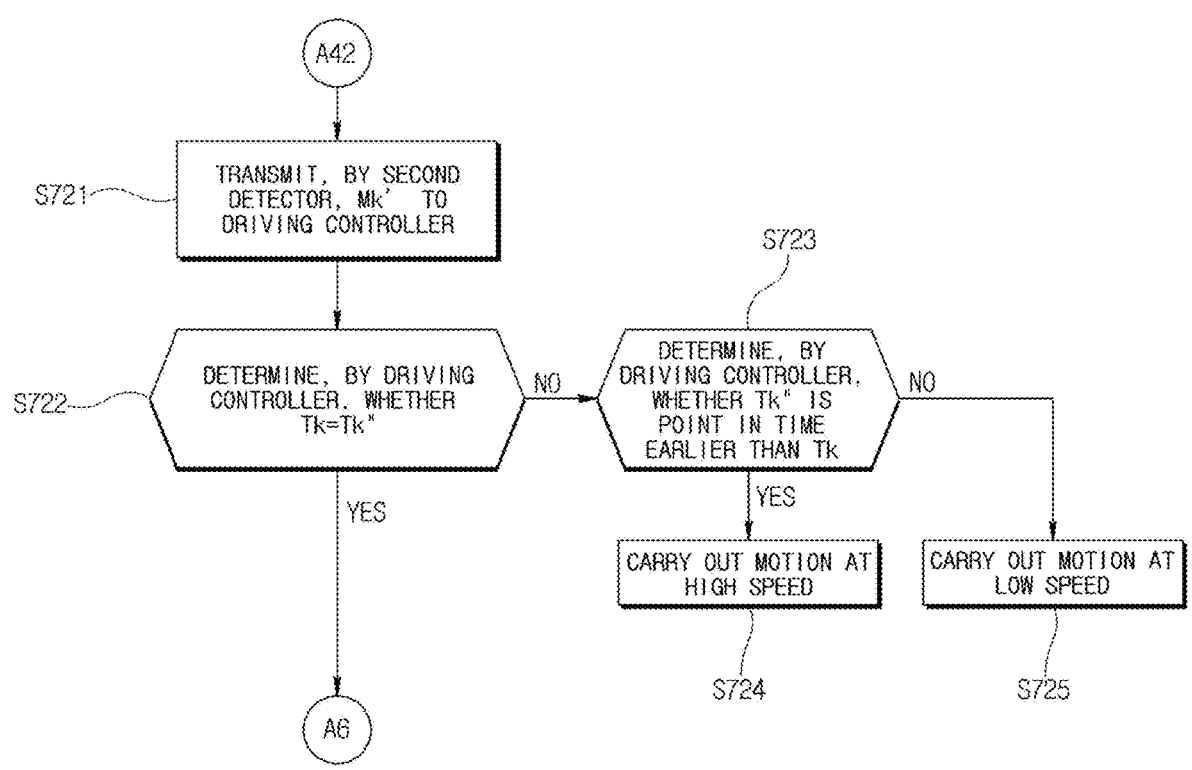
Figure 11:
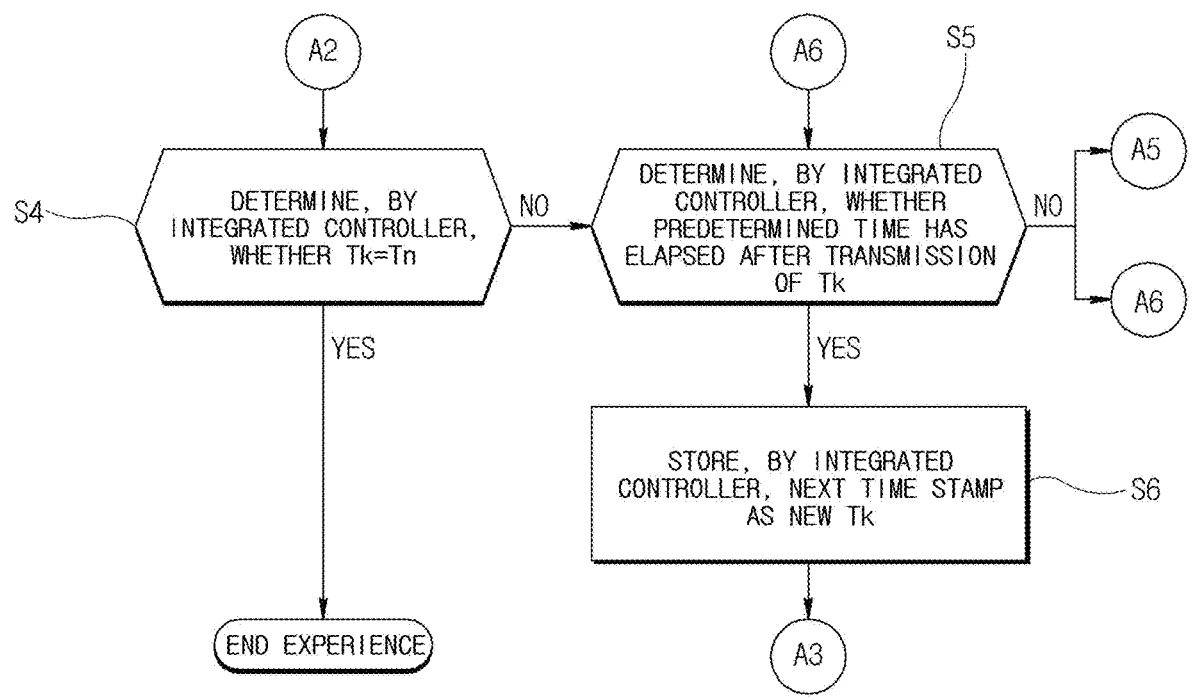
FIG. 11 is a flowchart illustrating part of a second control method for the virtual reality experience apparatus of FIG. 1.
Figure 12:
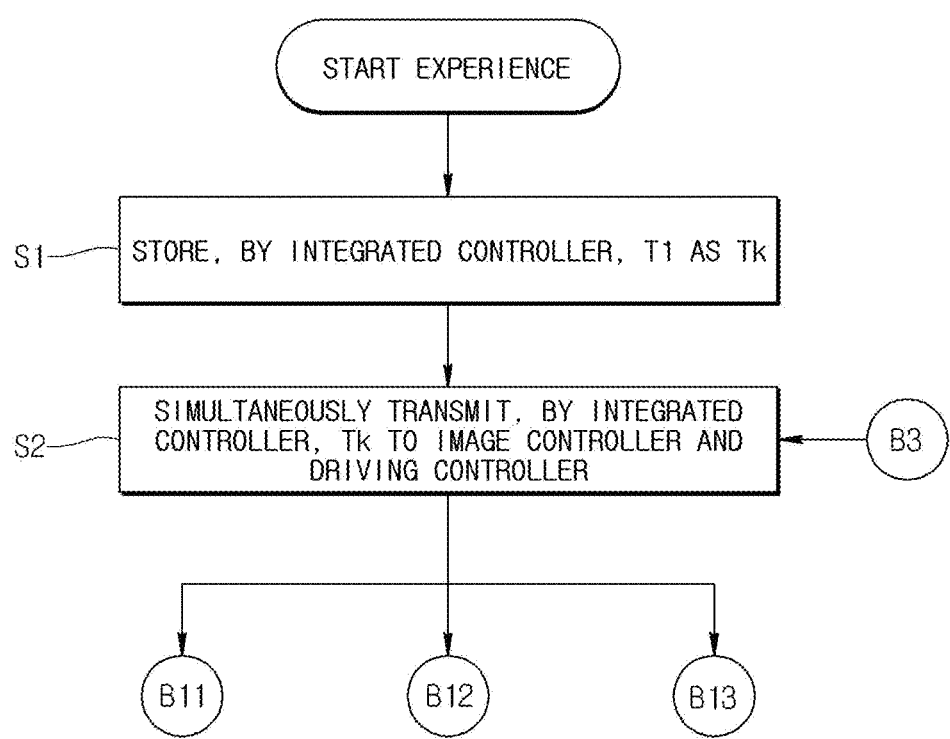
FIG. 12 is a flowchart illustrating part of a third control method for the virtual reality experience apparatus of FIG. 1.
Figure 13:
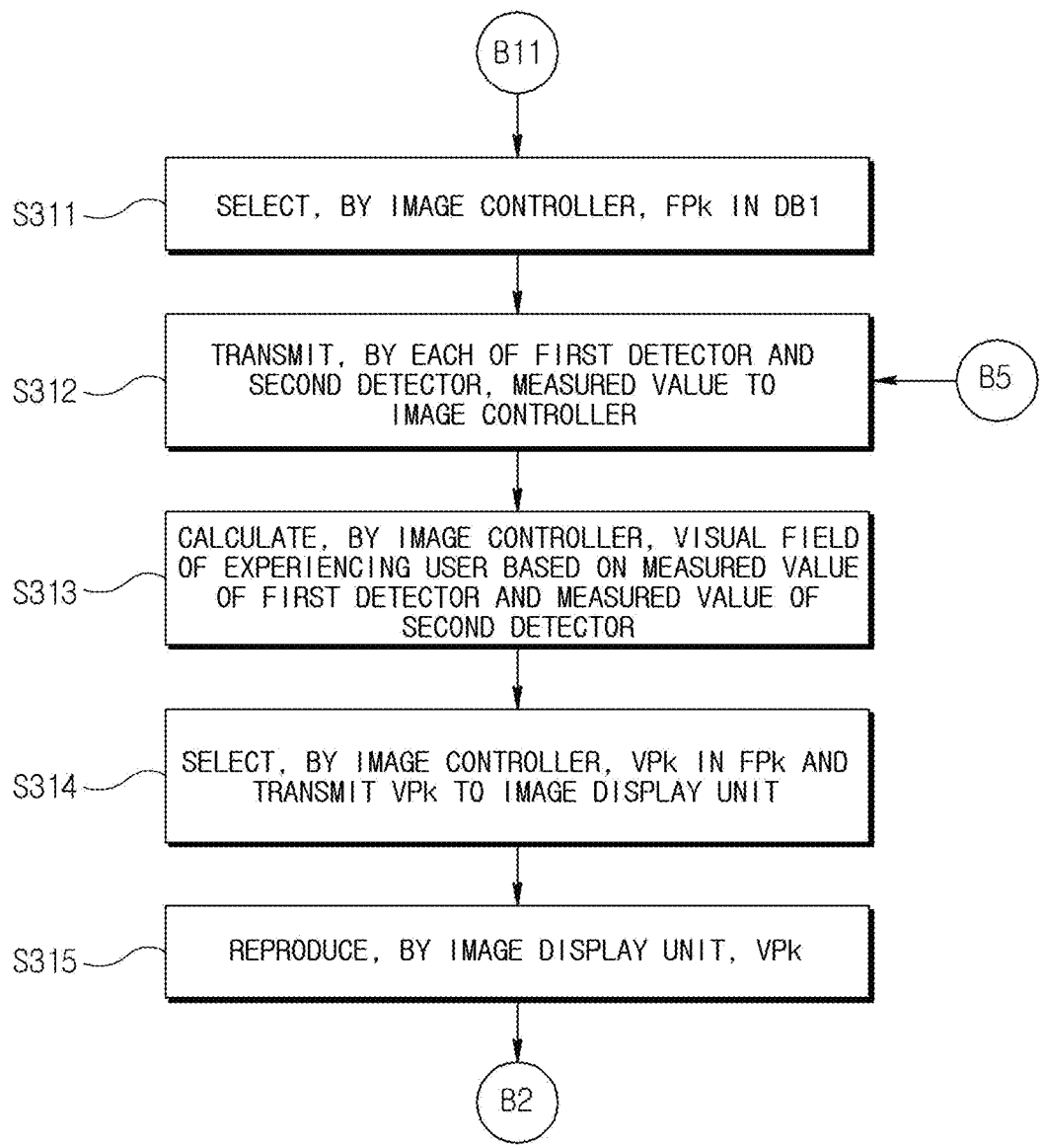
FIGS. 13 to 19 are flowcharts each illustrating another part of the third control method of FIG. 12.
Figure 14:
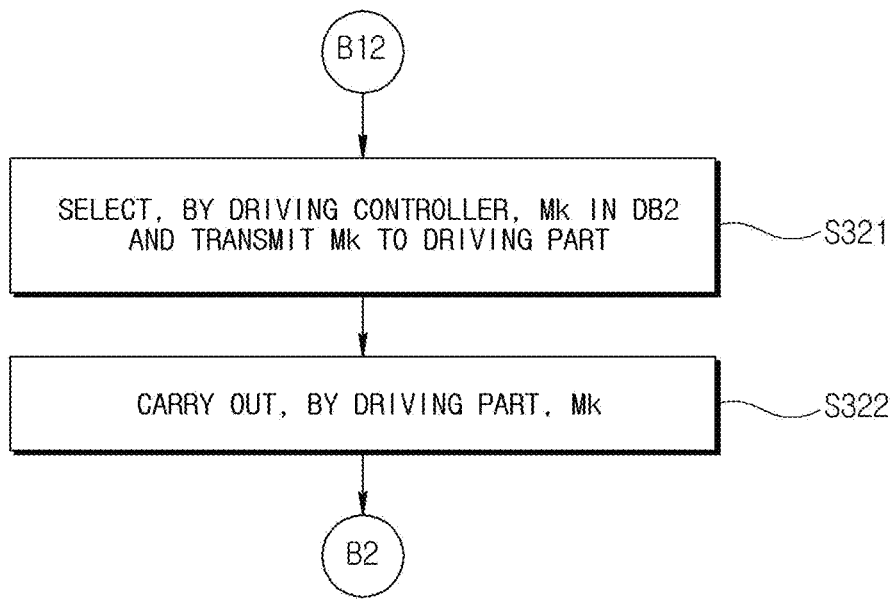
Figure 15:
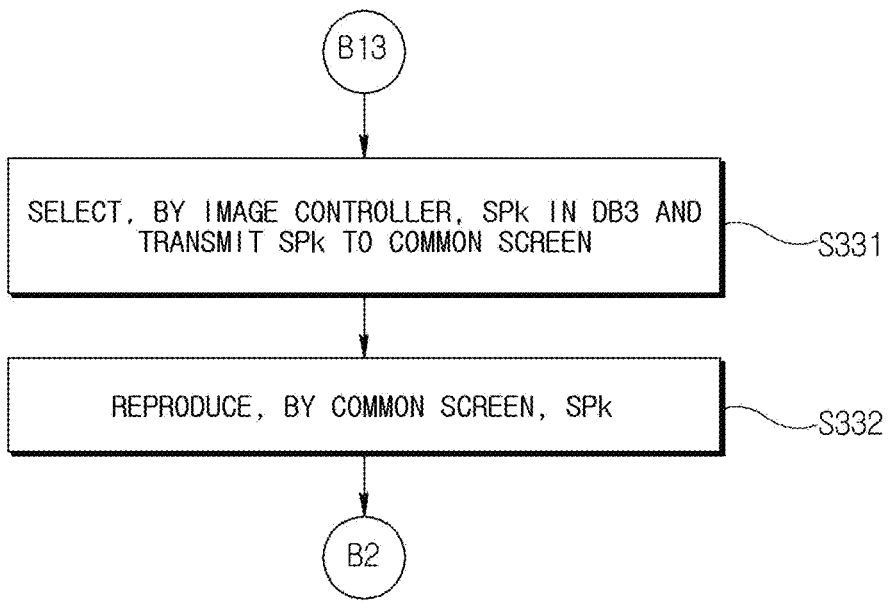
Figure 16:
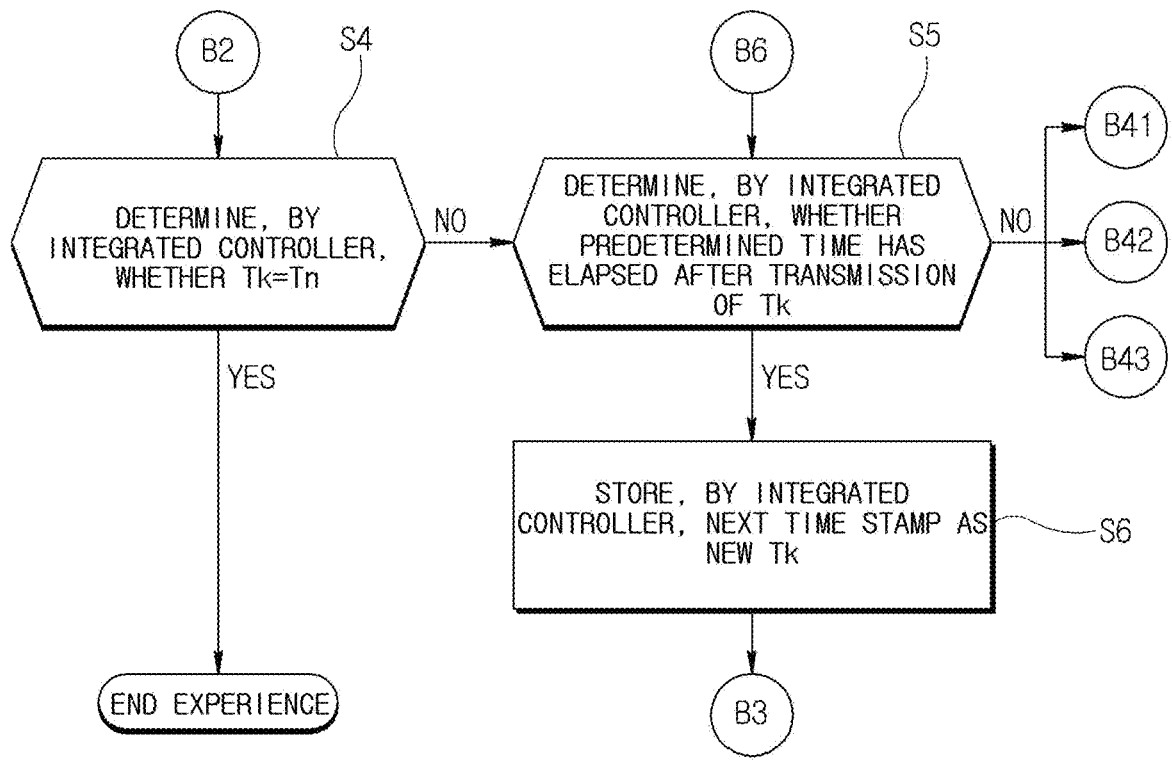
Figure 17:
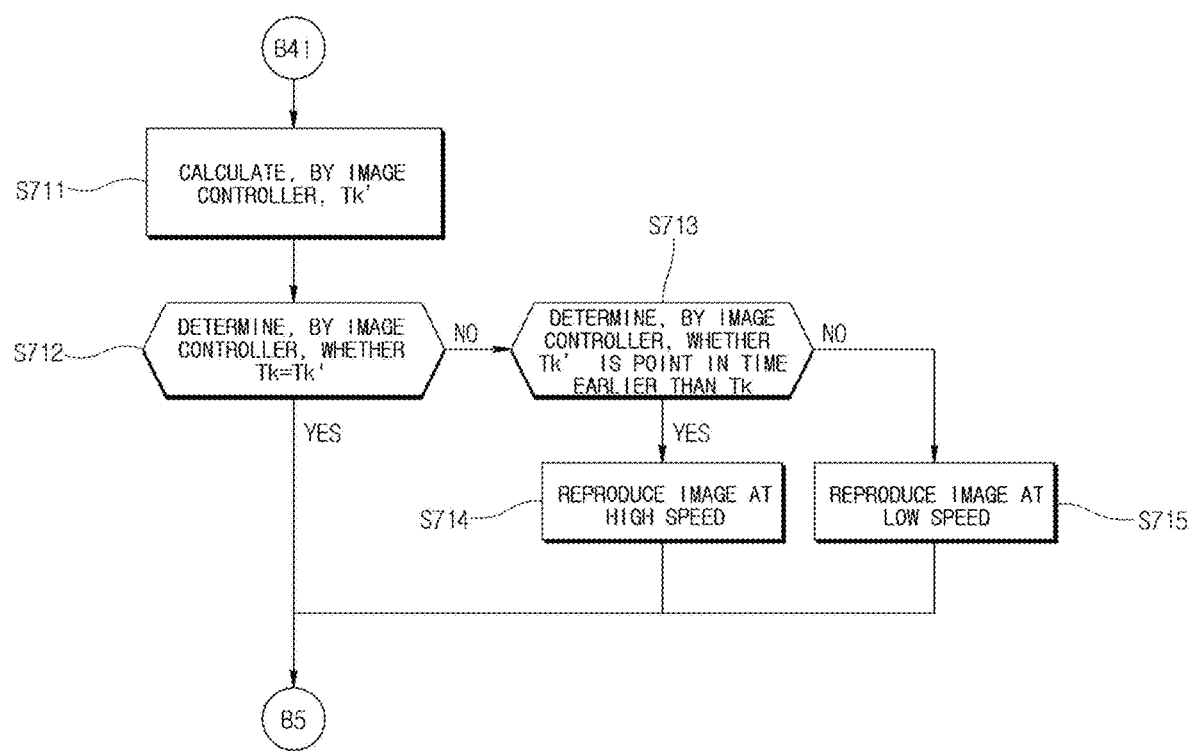
Figure 18:
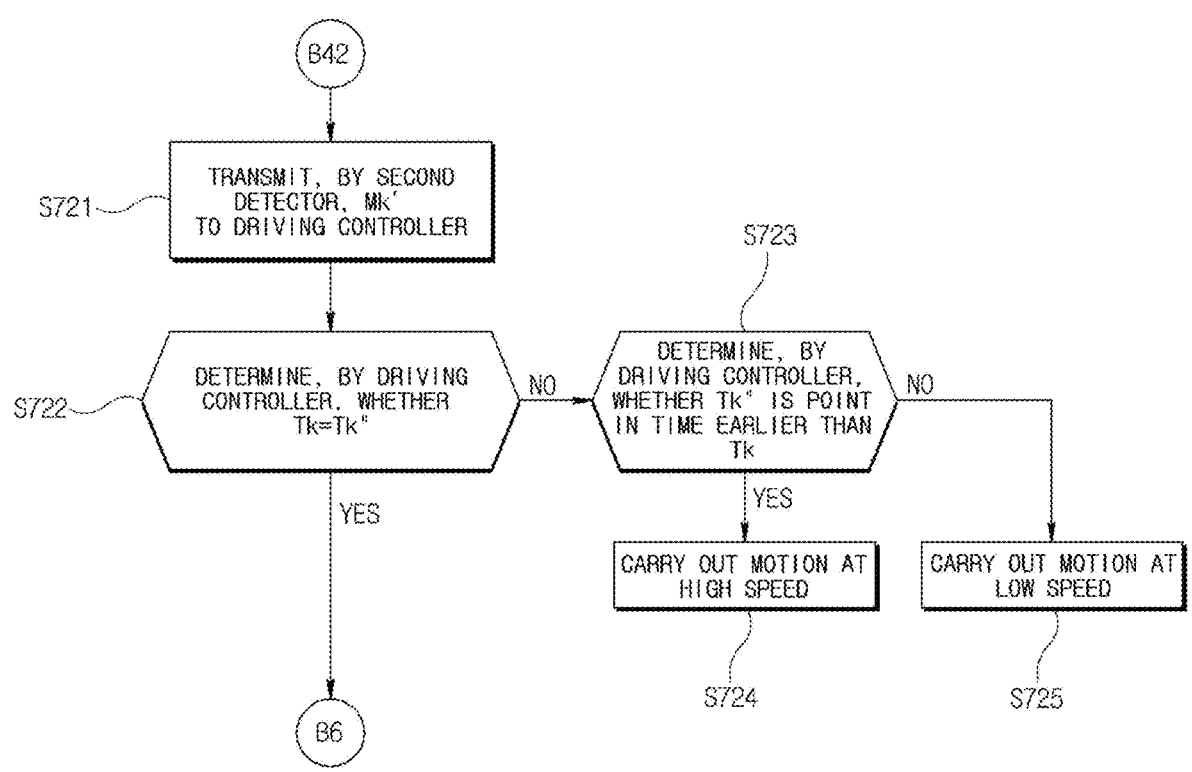
Figure 19:
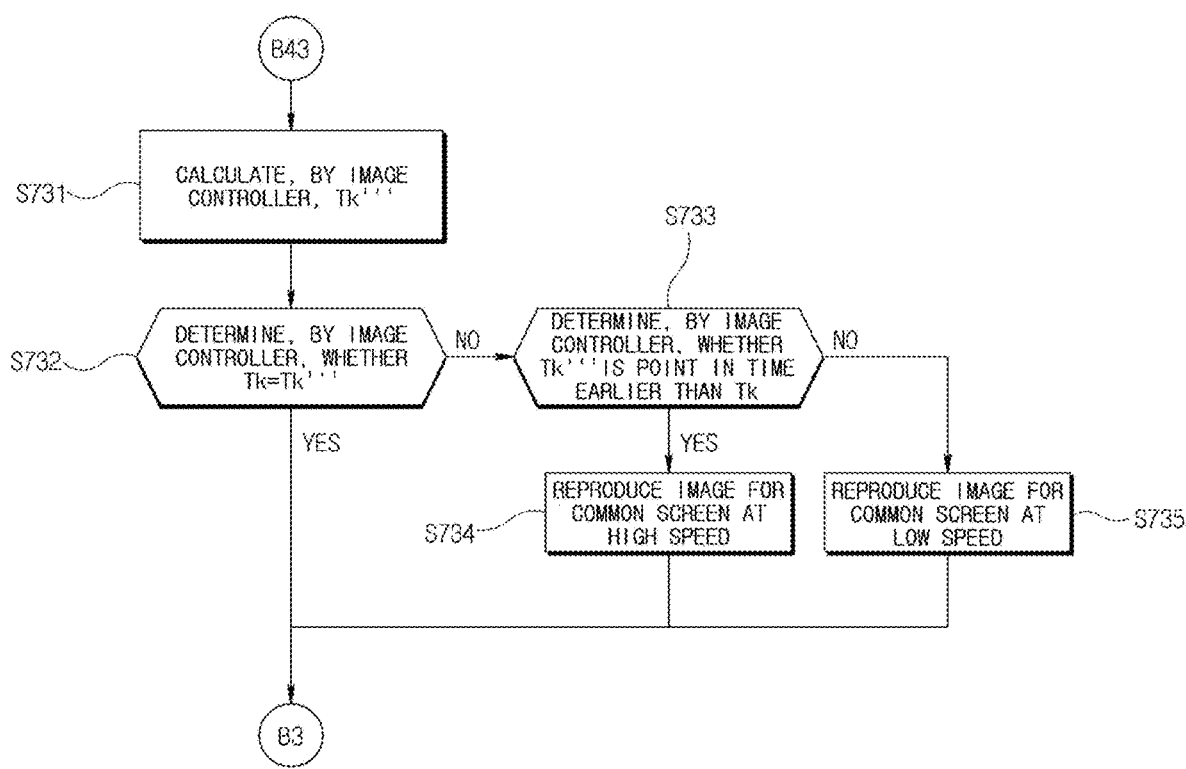

In the second control method, the steps illustrated in FIG. 8 may be replaced with steps illustrated in FIG. 11, and the steps illustrated in FIGS. 9 and 10 may be removed, when compared with the first control method. That is, the second control method may include steps illustrated in FIGS. 4, 5, 7, and 11. Accordingly, if it is determined in the fifth step (S5) that the predetermined time has elapsed, the method proceeds to the sixth step (S6), and if it is determined that the predetermined time has not elapsed, the method may simultaneously proceed to the 3-1-2-th step (S312) and the fifth step (S5).

Specifically, the second control method may include an editing step of editing the experienced image and the experienced motion before experience, and a carrying out step of carrying out the experience.

In the editing step, the editor 310 forms the time stamp code TC, the first database DB1, and the second database DB2, the time stamp code TC may be stored in the integrated controller 320, the first database DB1 may be stored in the image controller 120, and the second database DB2 may be stored in the driving controller 230.

In the carrying out step, once an experiencing user gets on the riding apparatus 200, and the image apparatus 100 is mounted on a head of the experiencing user, the experience may start.

Once the experience starts, in a first step (S1), the integrated controller 320 may store a first time stamp T1 which is an initial time stamp as a target time stamp Tk.

Next, in a second step (S2), the integrated controller 320 may simultaneously transmit the target time stamp Tk stored in the integrated controller 320 to the image controller 120 and the driving controller 230.

Next, in a 3-1-1-th step (S311), the image controller 120 may apply the target time stamp Tk received through the second step (S2) to the first database DB1 to select an image (omnidirectional image) FPk corresponding to the target time stamp Tk among the first to n-th images (omnidirectional image) FP1 to FPn.

Next, in a 3-1-2-th step (S312), the first detector 130 may transmit a measured value of the first detector 130 to the image controller 120, and the second detector 240 may transmit a measured value of the second detector 240 to the image controller 120.

Next, in a 3-1-3-th step (S313), the image controller 120 may calculate a visual field of the experiencing user based on the measured value of the first detector 130 and the measured value of the second detector 240.

Next, in a 3-1-4-th step (S314), the image controller 120 may select an image (visual-field-corresponding image) VPk corresponding to the visual field of the experiencing user that is calculated in the 3-1-3-th step (S313) in the image (omnidirectional image) FPk selected in the 3-1-1-th step (S311) to transmit the selected image to the image display unit 110 and the common screen 400.

Next, in a 3-1-5-th step (S315), the image display unit 110 and the common screen 400 may each reproduce the image VPk received through the 3-1-4-th step (S314).

Here, the common screen 400 is configured to provide non-experiencing people with the same image as the image VPk shown in the image display unit 110, but is not limited thereto. The common screen 400 may also be configured to provide the non-experiencing people with an image different from the image VPk shown in the image display unit 110 as in a third control method to be described later in order to solve a problem concerning an image of which experiencing user the common screen 400 reproduces in a case in which there are a plurality of experiencing users, or the common screen 400 itself may also be omitted in order to reduce a time and costs consumed for operating the common screen 400.

Meanwhile, in a 3-2-1-th step (S321), the driving controller 230 may apply the target time stamp Tk received through the second step (S2) to the second database DB2 to select a motion Mk corresponding to the target time stamp Tk among the first to n-th motions M1 to Mn, and transmit the selected motion Mk to the driving part 220.

Next, in a 3-2-2-th step (S322), the driving part 220 may carry out the motion received through the 3-2-1-th step (S321).

Meanwhile, when at least one of the 3-1-4-th step (S314) and the 3-2-2-th step (S322) ends, in a fourth step (S4), the integrated controller 320 may determine whether the experience ends. That is, the integrated controller 320 may determine whether the target time stamp Tk stored in the integrated controller 320 coincides with the n-th time stamp Tn which is a final time stamp.

Further, if it is determined in the fourth step (S4) that the experience ends (if the target time stamp Tk coincides with the n-th time stamp Tn), the experience ends, and if it is determined that the experience is being carried out (if the target time stamp Tk does not coincide with the n-th time stamp Tn), the method may proceed to a fifth step (S5) to be described later.

In the fifth step (S5), the integrated controller 320 may determine whether a predetermined time (interval between time stamps) has elapsed after the target time stamp Tk is transmitted in the second step (S2).

Further, if it is determined in the fifth step (S5) that the predetermined time has elapsed, the method proceeds to the sixth step (S6) to be described later, and if it is determined that the predetermined time has not elapsed, the method may simultaneously proceed to the 3-1-2-th step (S312) and the fifth step (S5).

In the sixth step (S6), the integrated controller 320 may store a time stamp subsequent to the time stamp stored as the target time stamp Tk up to now as a new target time stamp Tk. For example, if the time stamp stored as the target time stamp Tk up to now is the first time stamp T1, the second time stamp T2 may be stored as a new target time stamp Tk.

Further, after the sixth step (S6) ends, the method may return to the second step (S2).

In the virtual reality experience apparatus according to such configuration, a burden applied to the image controller 120 and the driving controller 230 is reduced, such that a processing speed of the image controller 120 and a processing speed of the driving controller 230 may improved and an error occurrence rate may be reduced. Accordingly, the experienced image may be formed with higher definition, and the experienced motion may be formed more precisely. In the case, it may be disadvantageous in terms of synchronization, however, most part of the synchronization is achieved in the editor 310, there may be no serious problem.

Meanwhile, the virtual reality experience apparatus may also be configured to be operable by a third control method illustrated in FIGS. 12 to 19.

That is, the virtual reality experience device may be configured to be practically the same as the case in which it is operable by the first control method, but may be configured so that the common screen 400 provides a non-experiencing person with an image SPk viewed in a predetermined visual field in the omnidirectional image FPk, which is a separate image from the experienced image provided to the experiencing user.

Specifically, the editor 310 may form a third database DB3 specifying common images SP1 to SPn to be reproduced on the common screen 400 at the first to n-th time stamps T1 to Tn.

Further, the third database DB3 may be stored in the image controller 120.

Further, the image controller 120 may be configured to apply the time stamp Tk received from the integrated controller 320 to the third database DB3 to select a common image SPk corresponding to the received time stamp Tk among the common images SP1 to SPn, and transmit the selected common image SPk to the common screen 400. Here, the image SPk transmitted to the common screen 400 may be an image viewed in a visual field different from that of the image VPk transmitted to the image display unit 110.

Further, the image controller 120 may be configured to compare a target common image with an actual common image at a predetermined frequency interval (e.g. 60 Hz) and make the target common image and the actual common image coincide with each other, based on the same principle as that of the experienced image. Detailed description therefor will be omitted in order to avoid an overlapped description.

Hereinafter, the third control method will be described.

In the third control method, the steps illustrated in FIGS. 3, 4, and 6 to 10 may be replaced with steps illustrated in FIGS. 12 to 19, when compared with the first control method. That is, the third control method may include steps illustrated in FIGS. 12 to 19.

Accordingly, in the editing step, the third database DB3 may be additionally formed in the editor 310, and stored in the image controller 120 together with the first database DB1.

Further, in the 3-1-4-th step (S314), the image controller 120 may select an image (visual-field-corresponding image) VPk corresponding to the visual field of the experiencing user that is calculated in the 3-1-3-th step (S313) in the image (omnidirectional image) FPk selected in the 3-1-1-th step (S311) to transmit the selected image to the image display unit 110.

Further, in the 3-1-5-th step (S315), the image display unit 110 may reproduce the image VPk received through the 3-1-4-th step (S314).

Further, in a 3-3-1-th step (S331), the image controller 120 may apply the target time stamp Tk received through the second step (S2) to the third database DB3 to select a common image SPk corresponding to the target time stamp Tk among the common images SP1 to SPn, and transmit the selected common image SPk to the common screen 400.

Further, in a 3-3-2-th step (S332), the common screen 400 may reproduce the common image SPk received through the 3-3-1-th step (S331).

Further, when at least one of the 3-1-4-th step (S314), the 3-2-2-th step (S322), and the 3-3-2-th step (S332) ends, the method may proceed to the fourth step (S4).

Further, if it is determined in the fifth step (S5) that the predetermined time has not elapsed, the method may simultaneously proceed to the 7-1-1-th step (S711), the 7-2-1-th step (S721), and a 7-3-1-th step (S731) to be described later.

In the 7-3-1-th step (S731), the image controller 120 may calculate an actual time stamp Tk''' that is a time stamp corresponding to the common image being reproduced on the common screen 400.

Then, in a 7-3-2-th step (S732), the image controller 120 may determine whether the actual time stamp Tk''' calculated in the 7-3-1-th step (S731) coincides with the target time stamp Tk received through the second step (S2).

Further, if it is determined in the 7-3-2-th step (S732) that the target time stamp Tk coincides with the actual time stamp Tk''', the method returns to the second step (S2), and if it is determined that the target time stamp Tk does not coincide with the actual time stamp Tk''', the method may proceed to a 7-3-3-th step (S733) to be described later.

In the 7-3-3-th step (S733), the image controller 120 may determine whether the actual time stamp Tk''' is a point in time earlier than the target time stamp Tk.

Further, if it is determined in the 7-3-3-th step (S733) that the actual time stamp Tk''' is a point in time earlier than the target time stamp Tk, the method proceeds to a 7-3-4-th step (S734) to be describe later, and if it is determined that the actual time stamp Tk' is a point in time later than the target time stamp Tk, the method may proceed to a 7-3-5-th step (S735) to be described later.

In the 7-3-4-th step (S734), the image controller 120 may instruct the common screen 400 to reproduce common images between a common image corresponding to the actual time stamp Tk''' and a common image corresponding to the target time stamp Tk at a reproduction speed faster than a predetermined reproduction speed.

Once the 7-3-4-th step (S734) ends, the method may return to the second step (S2).

In the 7-3-5-th step (S735), the image controller 120 may instruct the common screen 400 to reproduce common images subsequent to the common image corresponding to the actual time stamp Tk''' at a reproduction speed slower than the predetermined reproduction speed. Alternatively, the image controller 120 may instruct the common screen 400 to repeatedly reproduce the common image corresponding to the actual time stamp Tk'''.

Once the 7-3-5-th step (S735) ends, the method may return to the second step (S2).

Here, the 7-3-1-th to 7-3-5-th steps (S731 to S735) may be carried out at a predetermined frequency interval (e.g. 60 Hz).

The virtual reality experience apparatus according to such configuration may provide the common image even when the number of experiencing users is plural, thereby promoting and attracting experiencing users.

Meanwhile, the virtual reality experience apparatus according to the above-described embodiment is configured to provide, as the experienced image and the experienced motion, a predetermined image and a predetermined motion as time passes whether the experiencing user wants or not, so that the experiencing user experiences the virtual reality, just like watching a movie. However, as illustrated in FIGS. 20 to 24, the virtual reality experience apparatus may be configured to provide, as the experienced image and the experienced motion, an image and a motion that correspond to will of the experiencing user, so that the experiencing user experiences the virtual reality, just like playing a game.

Figure 20:
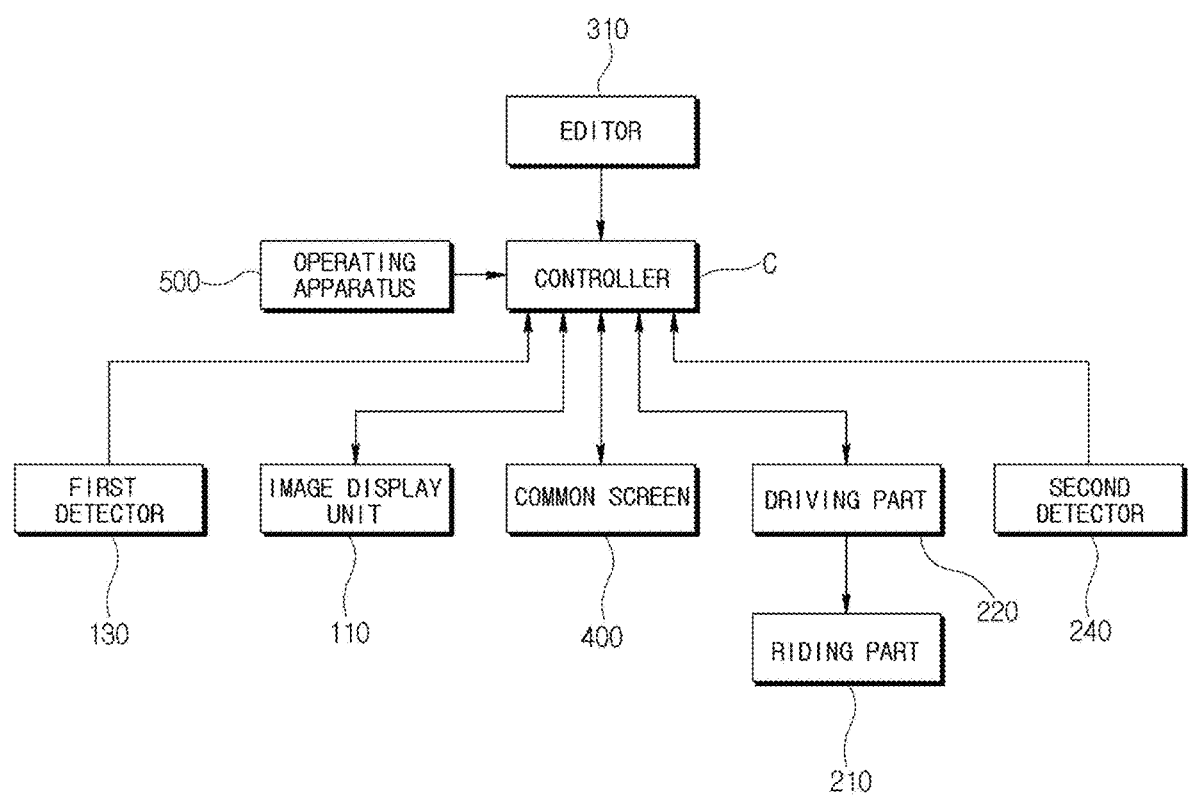
FIG. 20 is a schematic diagram illustrating components of a virtual reality experience apparatus according to another embodiment of the present invention.
Figure 21:
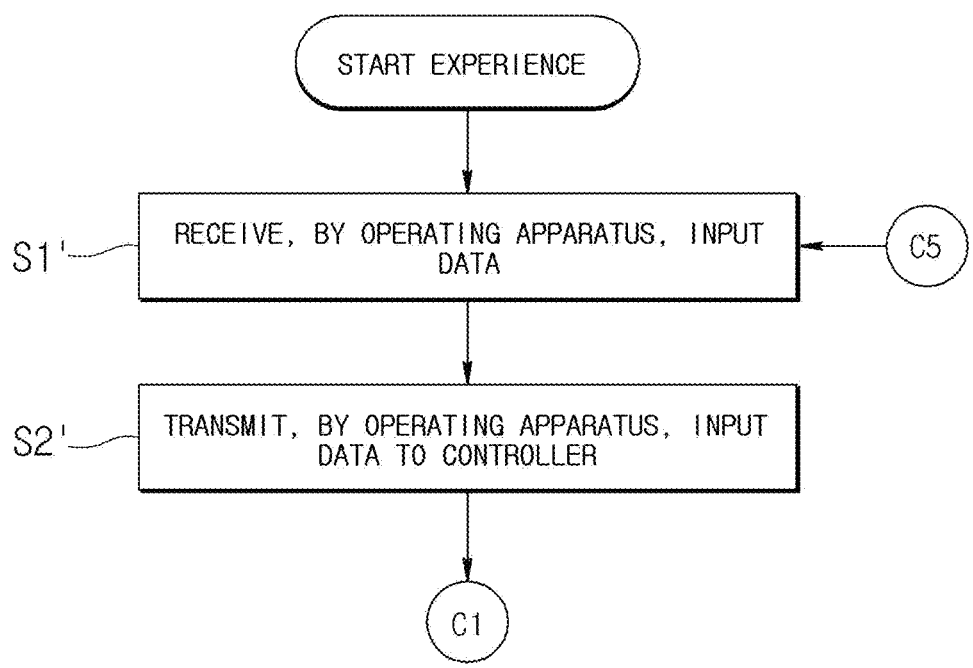
FIG. 21 is a flowchart illustrating part of a control method for the virtual reality experience apparatus of FIG. 20.
Figure 22:
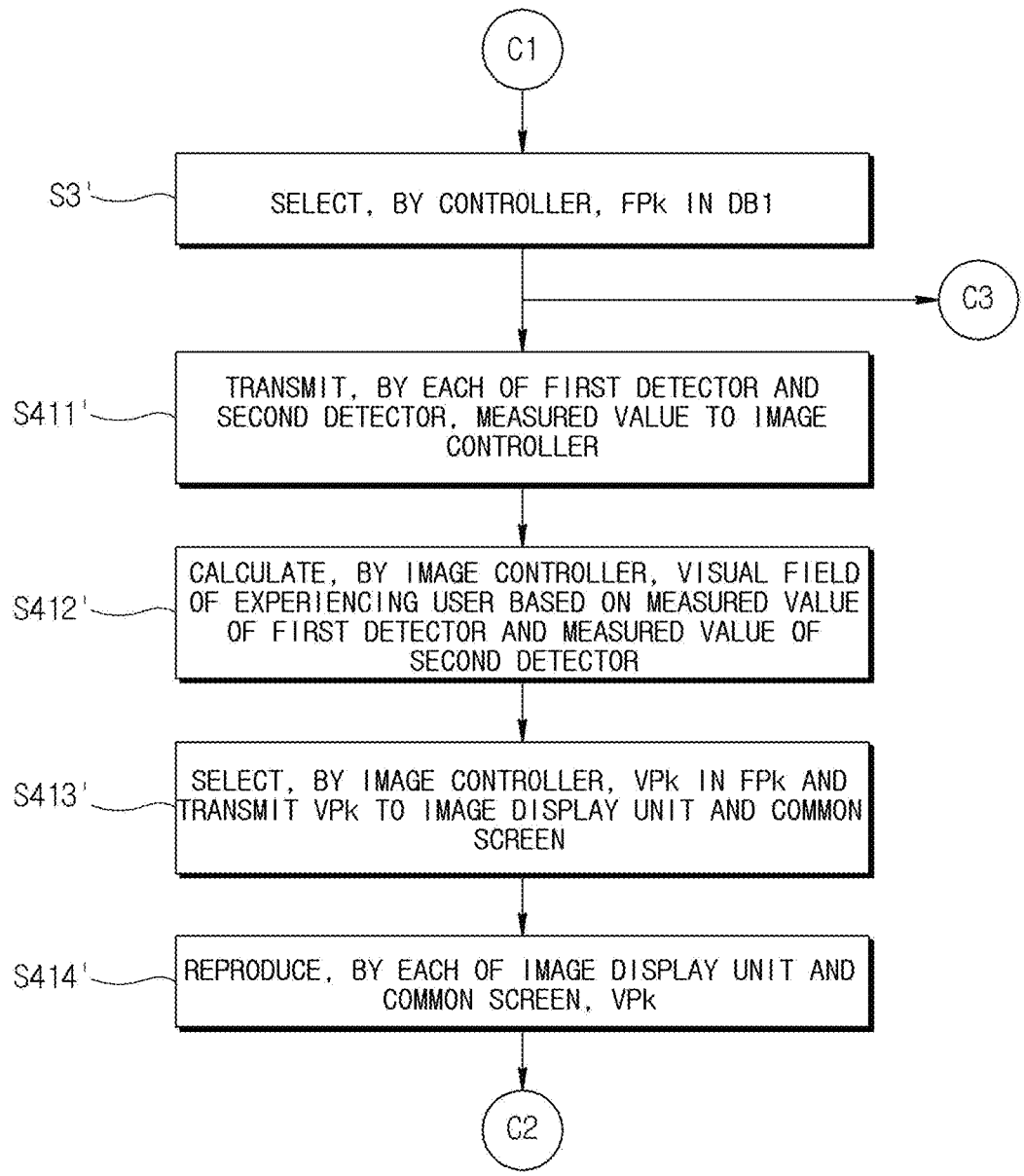
FIGS. 22 to 24 are flowcharts each illustrating another part of the control method of FIG. 21.
Figure 23:
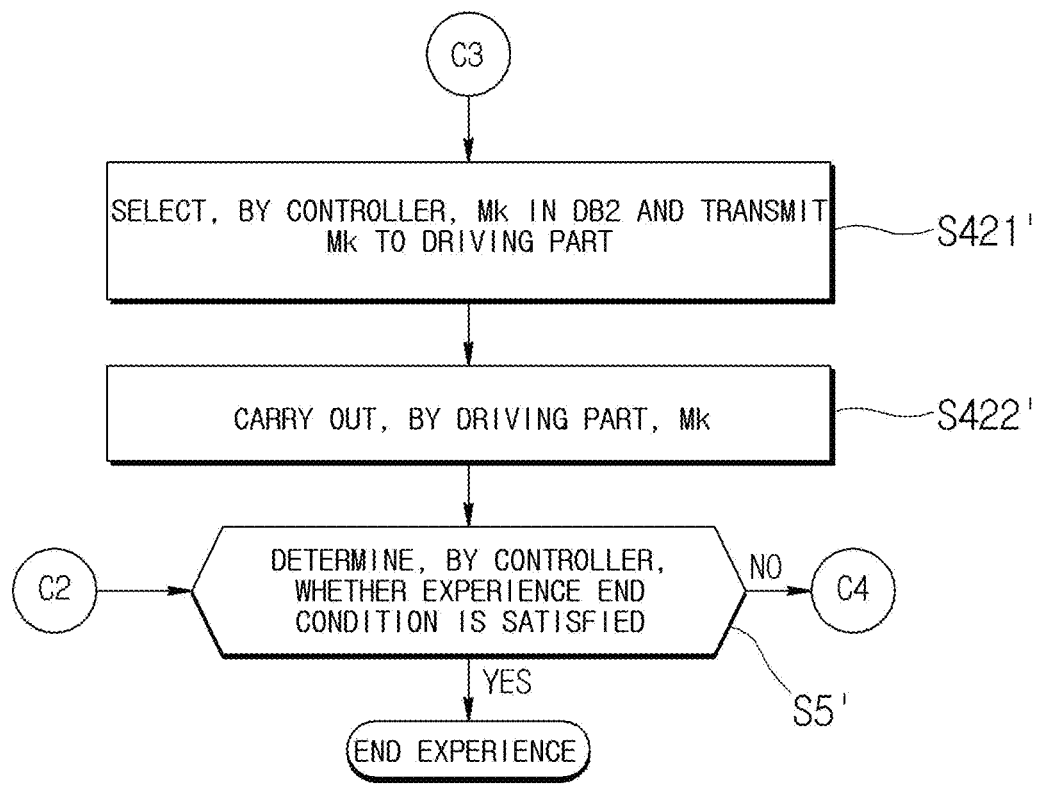
Figure 24:
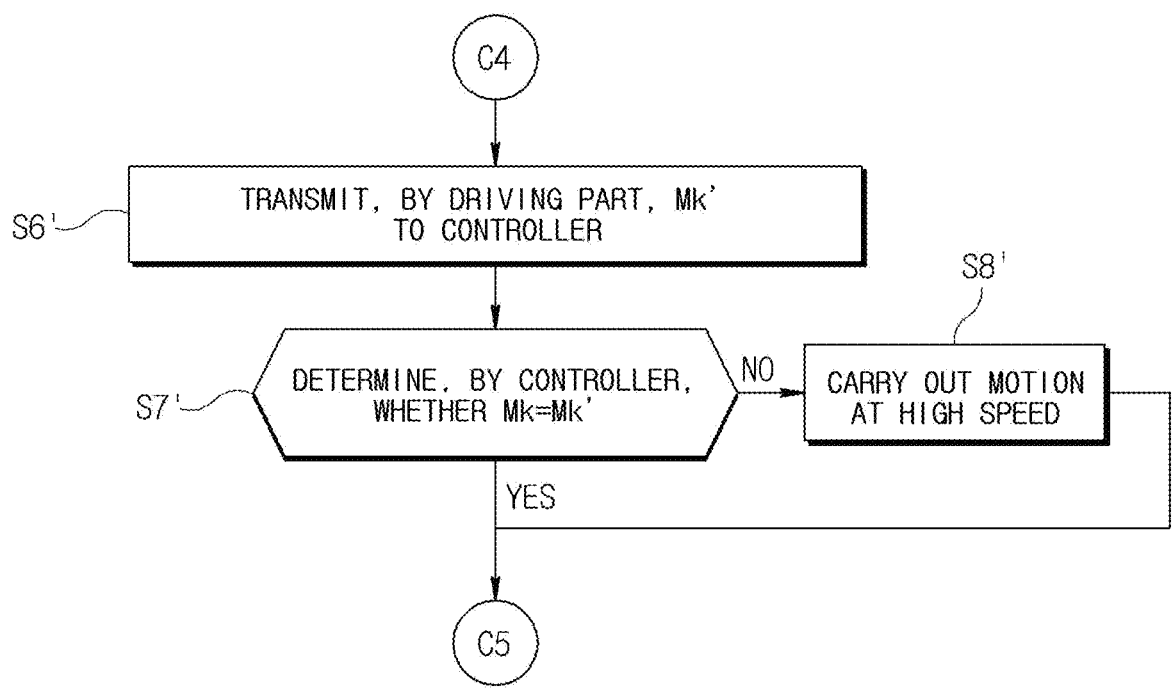

FIG. 20 is a schematic diagram illustrating components of a virtual reality experience apparatus according to another embodiment of the present invention, FIG. 21 is a flowchart illustrating part of a control method for the virtual reality experience apparatus of FIG. 20, and FIGS. 22 to 24 are flowcharts each illustrating another part of the control method of FIG. 21.

In this case, the image apparatus 100, the riding apparatus 200, and the control apparatus (not illustrated) may be configured to be practically the same as in the above-described embodiment.

However, in this case, as the experienced image, an image corresponding to will of the experiencing user may be provided, and as the experienced motion, a motion corresponding to will of the experiencing user may be provided.

Specifically, the virtual reality experience apparatus according to the present embodiment includes the image apparatus 100, the riding apparatus 200, the control apparatus (not illustrated), and the common screen 400, further includes an operating apparatus 500 receiving input data from an experiencing user, and may be configured so that the image apparatus 100 provides a virtual reality image corresponding to the input data to the experiencing user, and the riding apparatus 200 provides a physical motion corresponding to the input data to the experiencing user.

The operating apparatus 500 may be configured of, for example, a joystick, a haptic device, a button, a sensor (the first detector 130) for measuring gaze movement of the experiencing user, and the like, so that the input data include information on a position, directivity, speed, acceleration, rotation, and the like.

Further, the experienced image may be formed by game contents based on the input data.

The image apparatus 100 and the riding apparatus 200 may each be configured as a mater apparatus. That is, the image apparatus 100 may be configured to receive the input data from the operating apparatus 500 and provide the experienced image based on the input data, and the riding apparatus 200 may be configured to receive the input data from the operating apparatus 500 and provide the experienced motion based on the input data. However, in this case, a capacity of the first database DB1 and the second database DB2 may become large, and considerable time and costs may be consumed for forming the first database DB1 and the second database DB2.

Considering this, the image apparatus 100 may be configured as a mater apparatus, and the riding apparatus 200 may be configured as a slave apparatus as in the present embodiment. That is, the image apparatus 100 may be configured to receive the input data from the operating apparatus 500 and provide the experienced image based on the input data, and the riding apparatus 200 may be configured to provide the experienced motion based on the experienced image. Here, the riding apparatus 200 may be configured as a master apparatus, and the image apparatus 100 may be configured as a slave apparatus, however, since constraints on the image apparatus 100 are greater than on those on the riding apparatus 200, it may be preferable that the image apparatus 100 is configured as a master apparatus, and the image apparatus 100 is formed as a slave apparatus.

To this end, in the editor 310, the first database DB1 may be configured so that the experienced image is changed based on the input data, and the second database DB2 may be configured so that the experienced motion is changed based on the experienced image. That is, the first database DB1 may be configured so that the input data is an input value, and the experienced image is an output value, and the second database DB2 may be configured so that the experienced image is an input value, and the experienced motion is an output value.

Further, the controller C may be configured to store the first database DB1 and the second database DB2, receive the input data from the operating apparatus 500, and control the image apparatus 100 (more precisely, the image display unit 110) and the driving apparatus (more precisely, the driving part 220) based on the first database DB1, the second database DB2, and the input data. That is, the controller C may be configured to apply the input data received from the operating apparatus 500 to the first database DB1 to select the experienced image corresponding to the input data and transmit the selected experienced image to the image display unit 110, and apply the selected experienced image to the second database DB2 to select a motion corresponding to the image and transmit the selected motion to the driving part 220.

Further, the controller C may be configured to compare a target motion with an actual motion at a predetermined time interval (e.g. 12 ms) and make the target motion and the actual motion coincide with each other, for synchronization during experience.

Specifically, a measured value of the second detector 240 is transmitted to the controller C, and the controller C may be configured to compare an actual motion corresponding to the measured value of the second detector 240 with a target motion transmitted to the driving part 220.

Further, if the actual motion is different from the target motion, the controller C may instruct the driving part 220 to carry out the motion at a driving speed faster than a predetermine driving speed.

The virtual reality experience apparatus according to such configuration may be operated by a real-time control method illustrated in FIGS. 21 to 24.

That is, in the editing step, the first database DB1 and the second database DB2 may be formed in the editor 310 and stored in the controller C.

In the carrying out step, once the experiencing user gets on the riding apparatus 200, and the image apparatus 100 is mounted on a head of the experiencing user, the experience may start.

Once the experience starts, in a 1'-th step (S1'), the operating apparatus 500 may receive the input data from the experiencing user.

Next, in a 2'-th step (S2'), the operating apparatus 500 may transmit the input data received through the 1'-th step (S1') to the controller C.

Next, in a 3'-th step (S3'), the controller C may apply the input data received through the 2'-th step (S2') to the first database DB1 to select an image (omnidirectional image) FPk corresponding to the input data.

Next, in a 4-1-1'-th step (S411'), the first detector 130 may transmit a measured value of the first detector 130 to the controller C, and the second detector 240 may transmit a measured value of the second detector 240 to the controller C.

Next, in a 4-1-2'-th step (S412'), the controller C may calculate a visual field of the experiencing user based on the measured value of the first detector 130 and the measured value of the second detector 240.

Next, in a 4-1-3'-th step (S413'), the controller C may select an image (visual-field-corresponding image) VPk corresponding to the visual field of the experiencing user that is calculated in the 4-1-2'-th step (S412') in the image (omnidirectional image) FPk selected in the 3'-th step (S3') to transmit the selected image to the image display unit 110 and the common screen 400.

Next, in a 4-1-4'-th step (S414'), the image display unit 110 and the common screen 400 may each reproduce the image VPk received through the 4-1-3'-th step (S413').

Meanwhile, in a 4-2-1'-th step (S421'), the controller C may select a motion Mk corresponding to the image (omnidirectional image) FPk selected in the 3'-th step (S3') to transmit the selected motion Mk to the driving part 220.

Next, in a 4-2-2'-th step (S422'), the driving part 220 may carry out the motion Mk received through the 4-2-1'-th step (S421').

Meanwhile, when at least one of the 4-1-4'-th step (S414') and the 4-2-2'-th step (S422') ends, in a 5'-th step (S5'), the controller 320 may determine whether the experience ends. That is, the controller C may determine whether an experience end condition (for example, game over on game contents) that is separately set is satisfied.

Further, if it is determined in the 5'-th step (S5') that the experience ends (if the experience end condition is satisfied), the experience ends, and if it is determined that the experience is being carried out (if the experience end condition is not satisfied), the method may proceed to a 6'-th step (S6') to be described later.

In the 6'-th step (S6'), the second detector 240 may transmit a measured value (an actual motion of the driving part 220) of the second detector 240 to the controller C.

Next, in a 7'-th step (S7'), the controller C may determine whether the measured value of the second detector 240 received through the 6'-th step (S6') coincides with the target motion Mk of the driving part 220.

Further, if it is determined in the 7'-th step (S7') that an actual motion Mk' of the driving part 220 coincides with the target motion Mk, the method returns to the 1'-th step (SF), and if it is determined that the actual motion Mk' of the driving part 220 does not coincide with the target motion Mk, the method may proceed to a 8'-th step (S8') to be described later.

In the 8'-th step (S8'), the controller C may instruct the driving part 220 to carry out the motion at a driving speed faster than a predetermine driving speed.

Once the 8'-th step (S8') ends, the method may return to the 1'-th step (S1').

Here, the 6'-th to 8'-th steps (S6' to S8') may be carried out at a predetermined time interval (e.g. 12 ms).

Meanwhile, in the above-described embodiments, the driving part 220 is configured as the robot arm 221, but the driving part 220 may be configured by a gyro mechanism generating a pitching motion, a yawing motion, a rolling motion, and a reciprocating motion in the riding part 210, as illustrated in FIGS. 25 to 29. Here, the reciprocating motion may mean a motion in which the riding part 210 moves close to and away from a structure 23 supporting the gyro mechanism.

Figure 25:
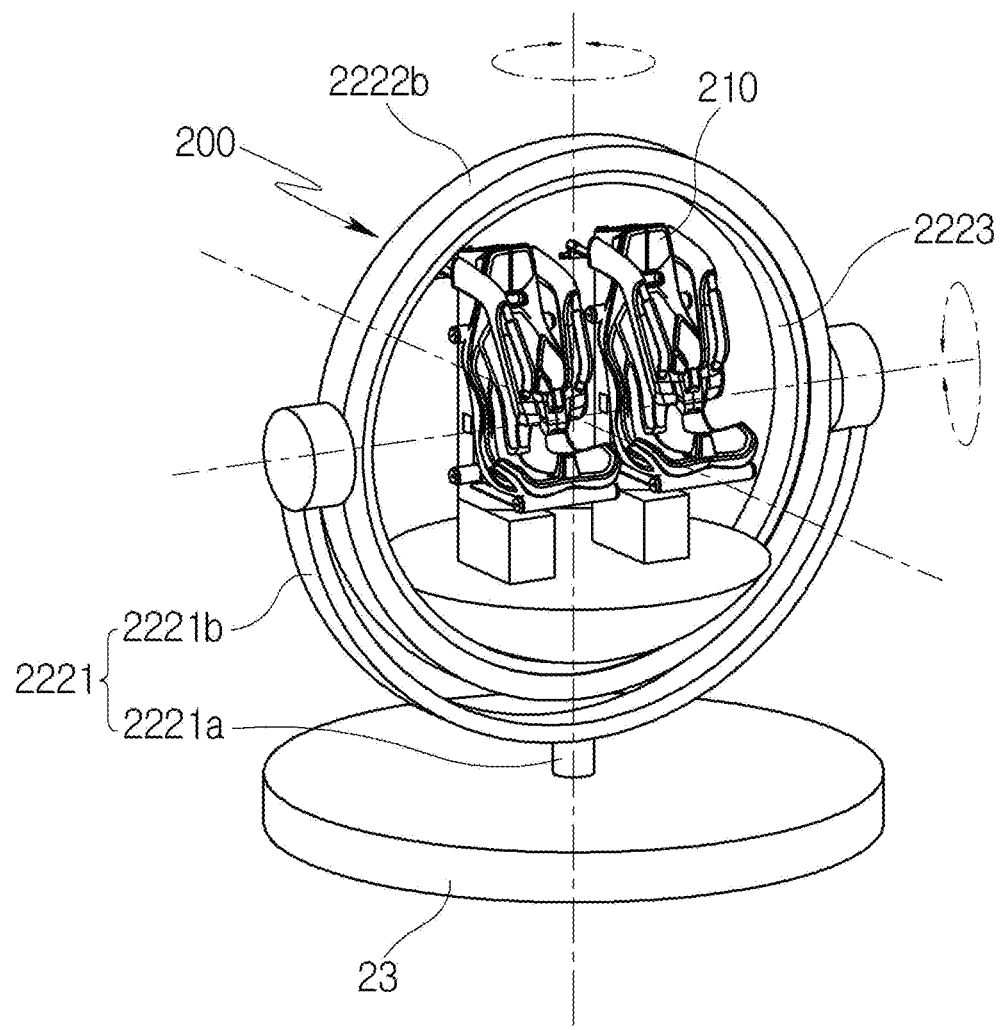
FIG. 25 is a perspective view illustrating a virtual reality experience apparatus according to still another embodiment of the present invention.

FIG. 25 is a perspective view illustrating a virtual reality experience apparatus according to still another embodiment of the present invention, and FIGS. 26 to 29 are plan views illustrating a motion provided by the virtual reality experience apparatus of FIG. 25.

Figure 26:
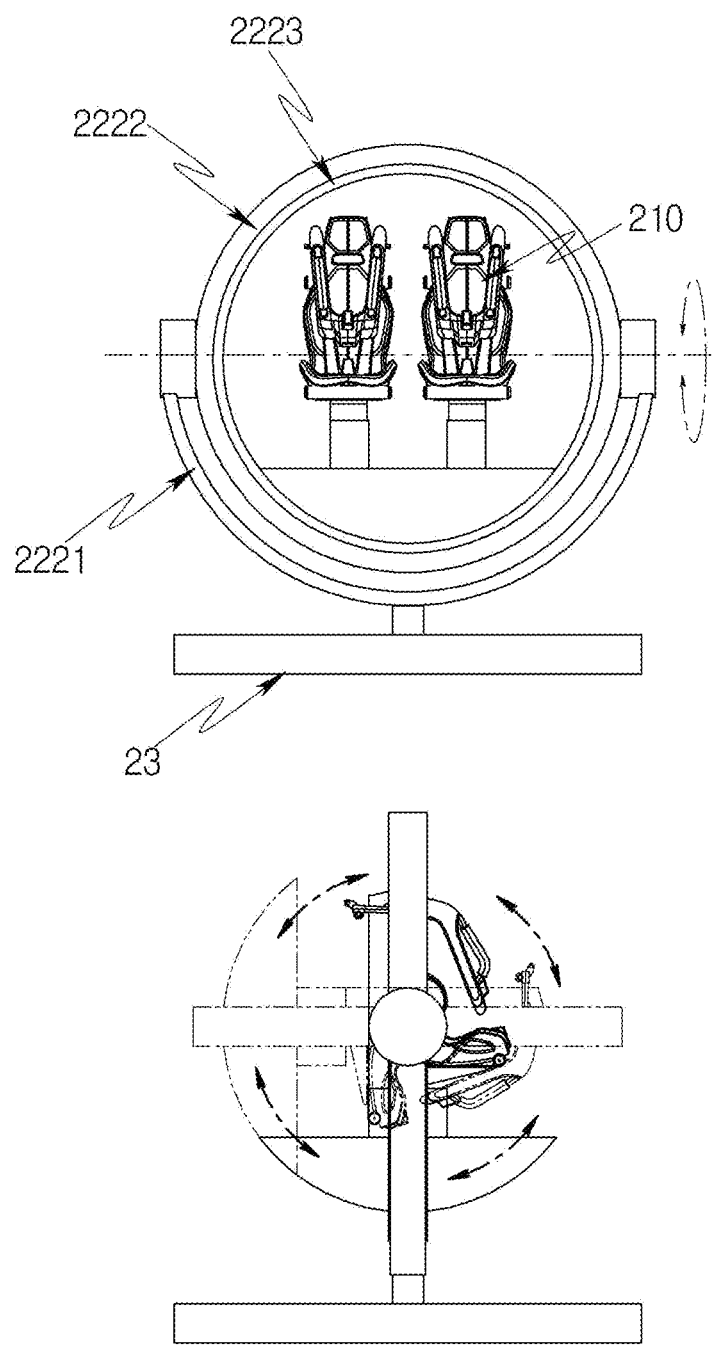
FIGS. 26 to 29 are plan views illustrating a motion provided by the virtual reality experience apparatus of FIG. 25.
Figure 27:
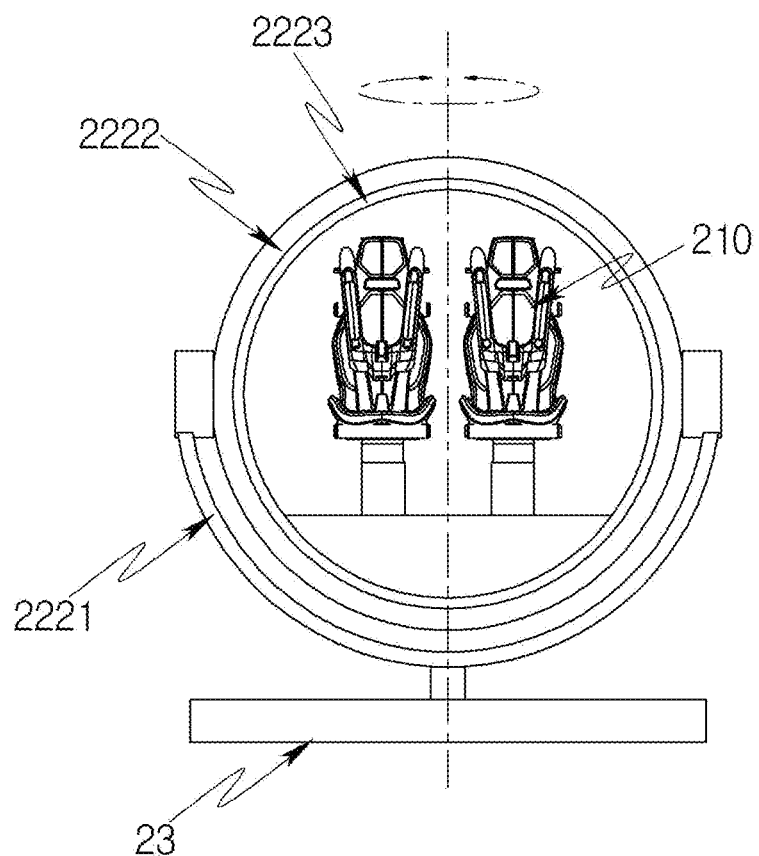
Figure 27:
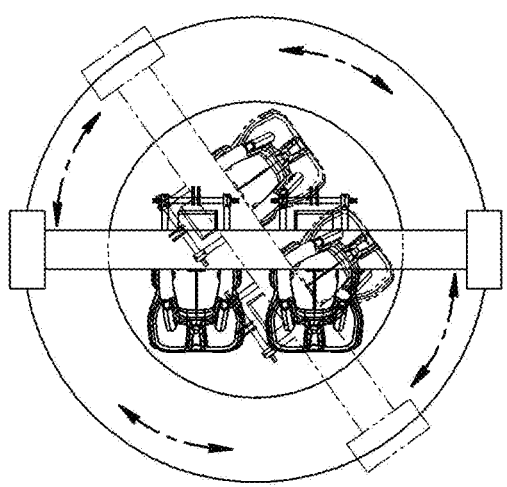
Figure 28:
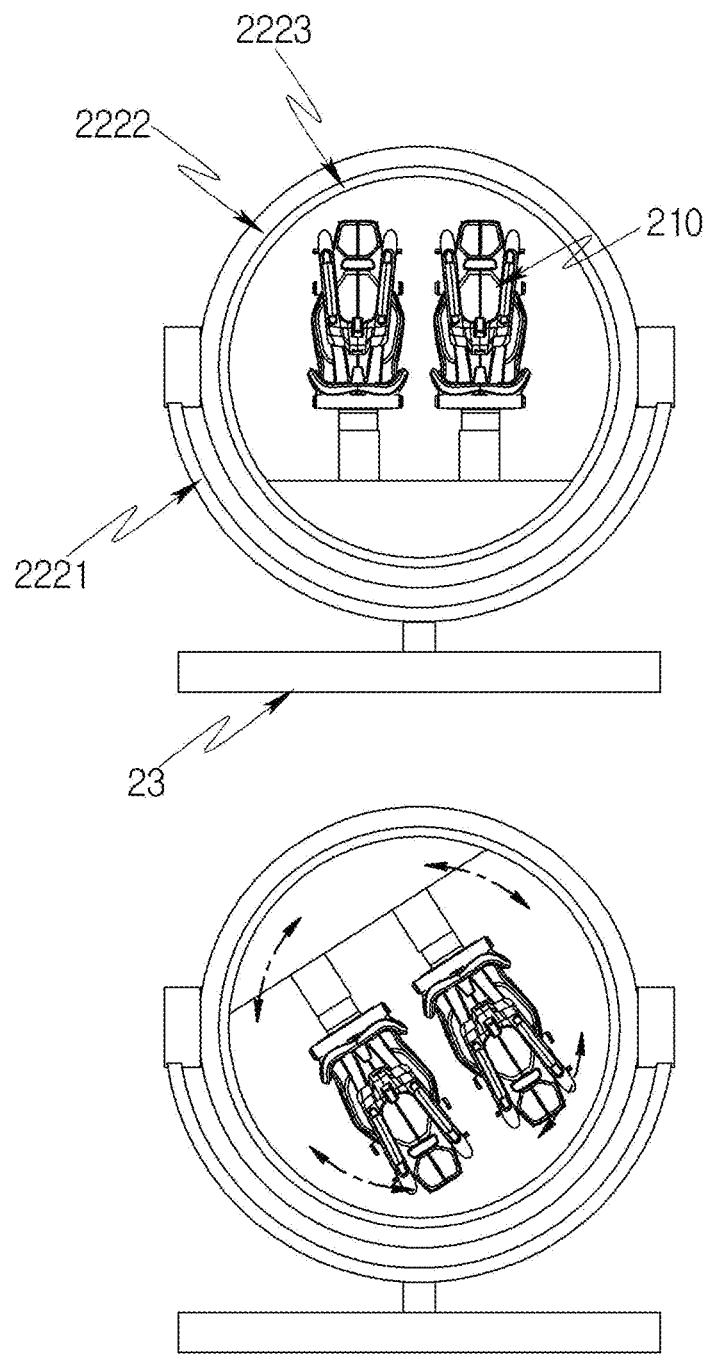
Figure 29:
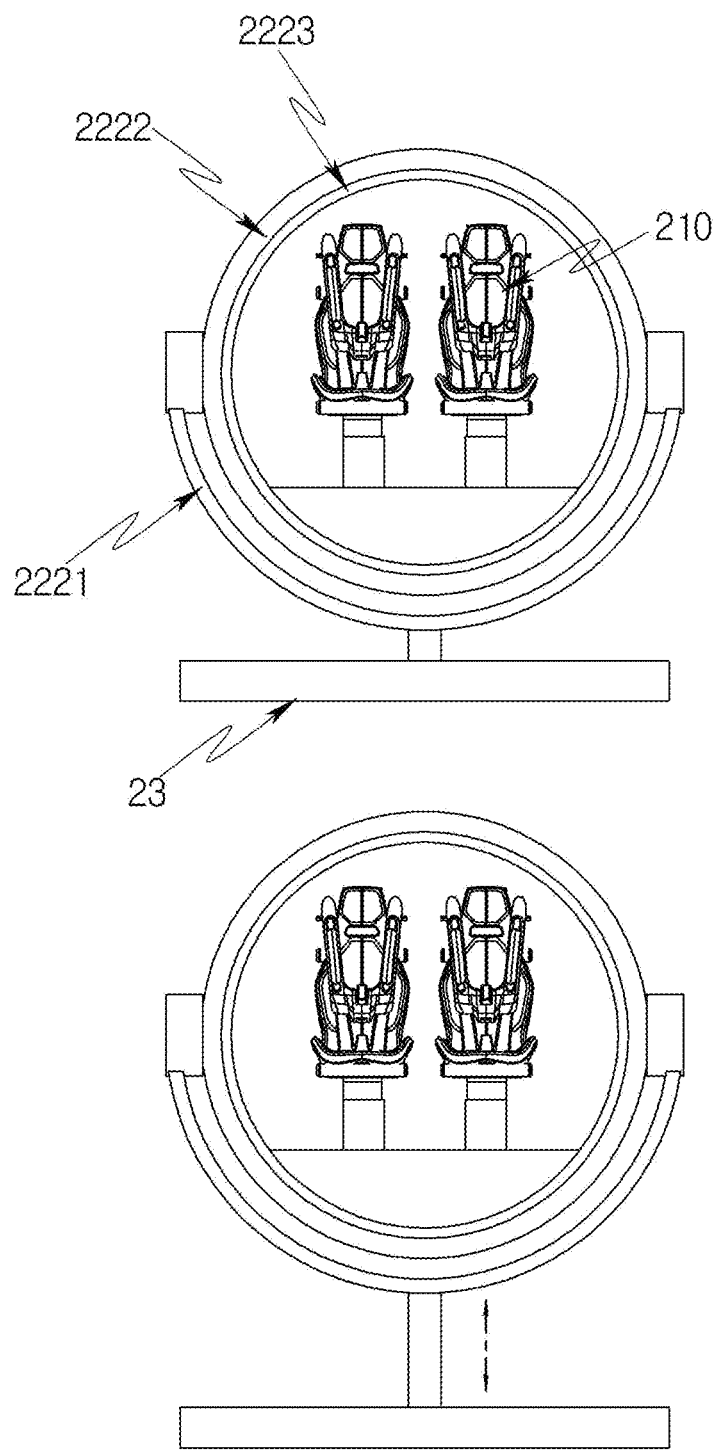

The gyro mechanism may include a first mechanism 2221 generating a yawing motion in the riding part 210 as illustrated in FIG. 27 and a reciprocating motion in the riding part 210 as illustrated in FIG. 29, a second mechanism 222 generating a pitching motion in the riding part 210 as illustrated in FIG. 26, and a third mechanism 2223 generating a rolling motion in the riding part 210 as illustrated in FIG. 28.

The first mechanism 2221 may be configured to be rotated and reciprocate based on the structure 23.

Specifically, the structure 23 is provided with a first fastening groove (not illustrated) into which the first mechanism 221 is inserted, and the first mechanism 2221 may include a base part 2221a inserted into the first fastening groove (not illustrated) and an arm part 2221b extending from the base part 2221a toward a side opposite to the structure 23 and supporting the second mechanism 2222.

The base part 2221a is configured to be rotatable with respect to a depth direction of the first fastening groove (not illustrated) as a rotational axis in a state of being inserted into the first fastening groove (not illustrated), and configured to be able to reciprocate in the depth direction of the first fastening groove (not illustrated).

Further, between the structure 23 and the first mechanism 2221 (more precisely, the base part 2221a), a first actuator (not illustrated) generating a driving force required for a rotating motion of the first mechanism 2221 and a second actuator (not illustrated) generating a driving force required for the reciprocating motion of the first mechanism 2221.

The first actuator (not illustrated) and the second actuator (not illustrated) may be configured to each include a motor, a decelerator, and a driving force transfer mechanism (for example, a pulley, a sprocket, a belt, and a chain).

Here, although not separately illustrated, the first mechanism 2221 may also be configure to be rotatable with respect to the structure 23, and be reciprocatable in a direction in which a portion supporting the second mechanism 222 moves close to and away from the structure 23. That is, the arm part 2221b may include a first arm part 2221ba fixedly coupled to the base part 2221a, and a second arm part 2221bb supporting the second mechanism 222 and reciprocatably coupled to the first arm part 2221ba, and the base part 2221a may be configured so that only a rotating motion may be performed with respect to the depth direction of the first fastening groove (not illustrated) as a rotational axis in a state in which the base part 2221a is inserted into the first fastening groove (not illustrated). In this case, between the structure 23 and the first mechanism 2221, the first actuator (not illustrated) is formed, and between the first arm part 2221ba and the second arm part 2221bb, the second actuator (not illustrated) generating a driving force required for the reciprocating motion of the second arm part 2221bb may be formed.

The second mechanism 2222 may be configured to be supported by the first mechanism 2221 (more precisely, the arm part 2221b), and be rotatable in a direction perpendicular to the rotational axis of the first mechanism 2221.

Specifically, the arm part 2221b of the first mechanism 2221 is provided with a second fastening groove (not illustrated) extending in a direction perpendicular to the depth direction of the first fastening groove (not illustrated), and the second mechanism 2222 may include a hinge part (not illustrated) inserted into the second fastening groove (not illustrated) and an annular part 2222b extending in an annular shape from the hinge part (not illustrated) and supporting the third mechanism 2223. Here, the hinge part (not illustrated) may be configured to extend in a radial direction of the annular part 2222b from an outer circumferential portion of the annular part 2222b.

The hinge part (not illustrated) may be configured to be rotatable with respect to a depth direction of the second fastening groove (not illustrated) as a rotational axis in a state of being inserted into the second fastening groove (not illustrated).

Further, between the arm part 2221b of the first mechanism 2221 and the second mechanism 2222 (more precisely, the hinge part (not illustrated)), a third actuator (not illustrated) generating a driving force required for a rotating motion of the second mechanism 2222 may be formed.

The third actuator (not illustrated) may be formed to be similar to the first actuator (not illustrated).

The third mechanism 2223 may be configured to be supported by the second mechanism 2222 (more precisely, the annular part 2222b), and be rotatable in a direction perpendicular to the rotational axis of the first mechanism 2221 and the rotational axis of the second mechanism 2222. At this time, the riding part 210 may be fixedly coupled to the third mechanism 2223.

Specifically, the third mechanism 2223 may be formed in an annular shape forming concentric circles with the second mechanism 2222 (more precisely, the annular part 2222b), and an outer circumferential surface of the third mechanism 2223 may be rotatably coupled to an inner circumferential surface of the second mechanism 2222 (more precisely, the annular part 2222b).

Further, between the inner circumferential surface of the second mechanism 2222 and the outer circumferential surface of the third mechanism 2223, a fourth actuator (not illustrated) generating a driving force required for a rotating motion of the third mechanism 2222 may be formed.

Here, the third mechanism 2223 may be slidably coupled to the inner circumferential surface of the second mechanism 2222 in a circumferential direction in a state in which the whole outer circumferential surface of the third mechanism 2223 faces the whole inner circumferential surface of the second mechanism 2222.

The virtual reality experience apparatus including the gyro mechanism according to such configuration may provide the experienced motion to the experiencing user even in a narrower space as compared with the virtual reality experience apparatus including the robot arm 221.

Meanwhile, in the embodiments illustrated in FIGS. 25 to 29, the gyro mechanism is configured to be able to provide all the pitching motion, the yawing motion, the rolling motion, and the reciprocating motion, but may also be configured to be able to provide only part of the pitching motion, the yawing motion, the rolling motion, and the reciprocating motion.

Meanwhile, the driving part 220 may also be configured to include the robot arm 221 and the gyro mechanism 222 as illustrated in FIGS. 30 to 34. At this time, the riding part 210 may be coupled to the third mechanism 2223 of the gyro mechanism 222, and the gyro mechanism 222 may be coupled to the free end of the robot arm 221.

Figure 30:
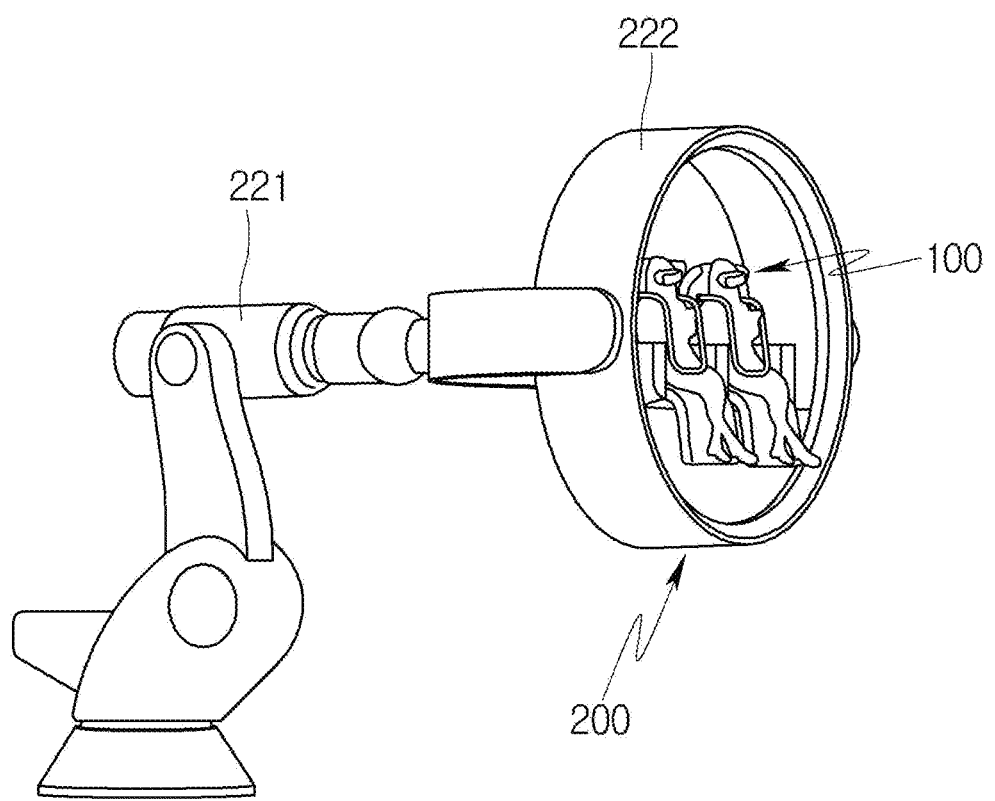
FIG. 30 is a perspective view illustrating a virtual reality experience apparatus according to still yet another embodiment of the present invention.

FIG. 30 is a perspective view illustrating a virtual reality experience apparatus according to still another embodiment of the present invention, and FIGS. 31 to 34 are perspective views each illustrating motions provided by the virtual reality experience apparatus of FIG. 30.

In this case, a motion that may not be implemented by the robot arm 221 may be provided.

Figure 31:
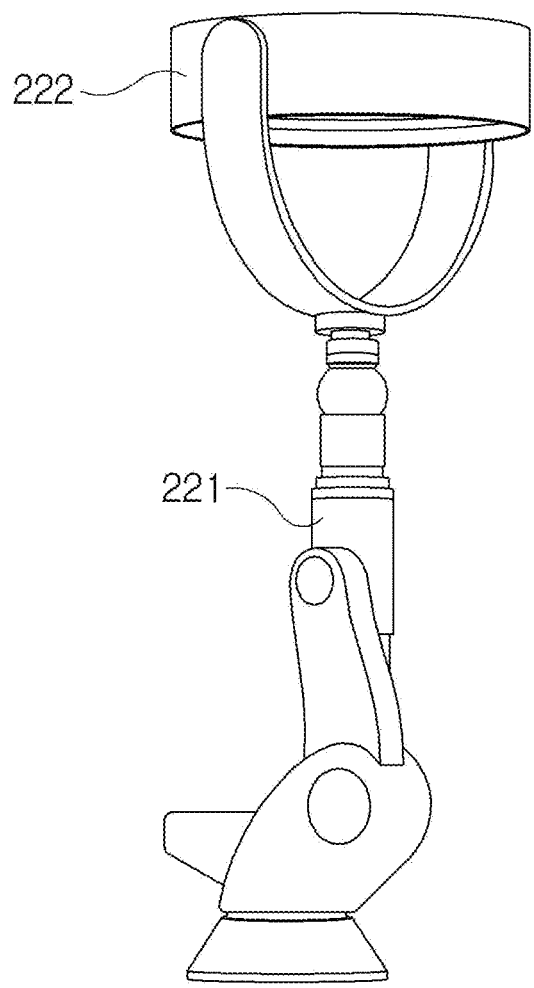
FIGS. 31 to 34 are perspective views each illustrating motions provided by the virtual reality experience apparatus of FIG. 30.
Figure 32:
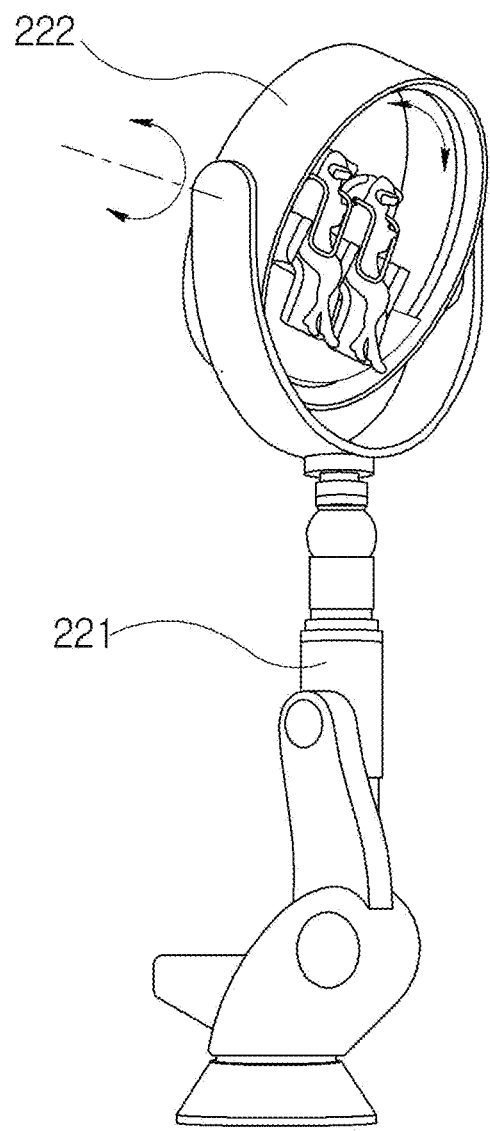

For example, referring to FIGS. 31 and 32, the robot arm 221 may generate at least one of the pitching motion, the yawing motion, the rolling motion, and the reciprocating motion in the riding part 210 in a state in which the riding part 210 is positioned maximally upward by the robot arm 221, such that the experiencing user may experience various motions even at the maximum upward position.

Figure 33:
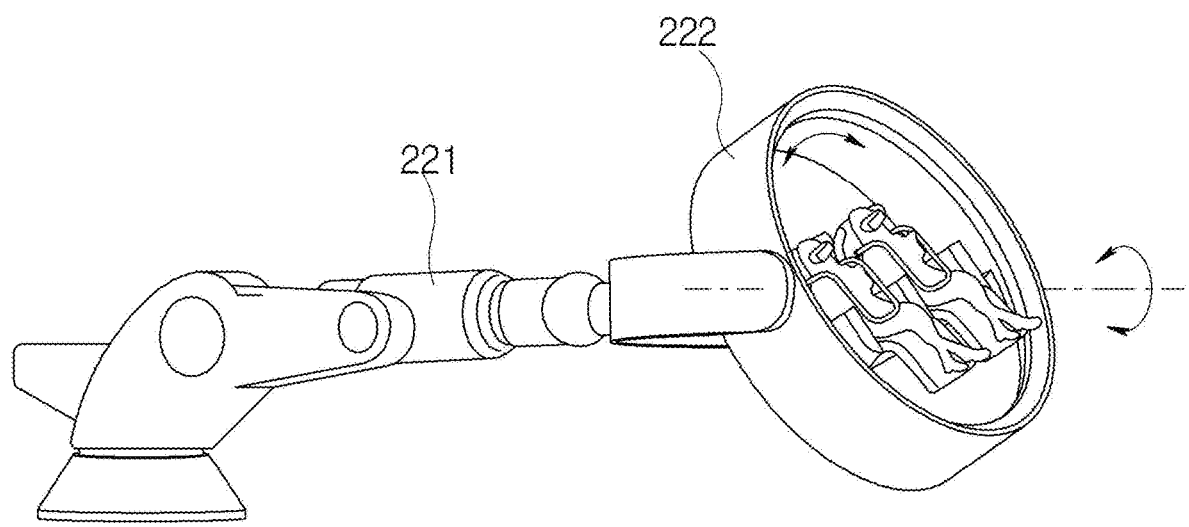

As another example, referring to FIG. 33, the robot arm 221 may generate at least one of the pitching motion, the yawing motion, the rolling motion, and the reciprocating motion in the riding part 210 in a state in which the riding part 210 is positioned maximally forward by the robot arm 221, such that the experiencing user may experience various motions even at the maximum forward position.

Figure 34:
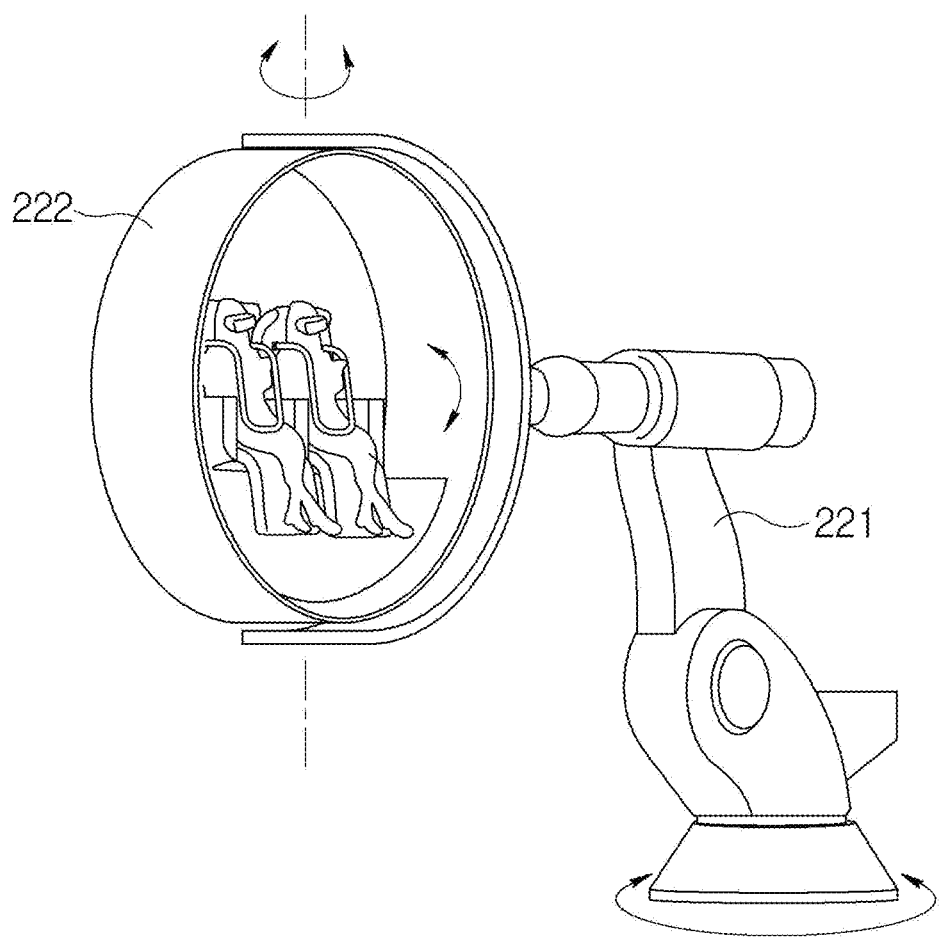

As still another example, referring to FIG. 34, the gyro mechanism 222 may apply at least one of the pitching motion, the yawing motion, the rolling motion, and the reciprocating motion in the riding part 210 in a state in which the robot arm 221 revolves the riding part 210 based on the ground, such that the experiencing user may rotate in a state of revolving and experience various motions.

By doing so, a limitation in motions provided by the driving part 220 is reduced to improve a degree of freedom in producing an image, and as a result, constraints on virtual reality intended to be implemented may be decreased.

Figure 35:
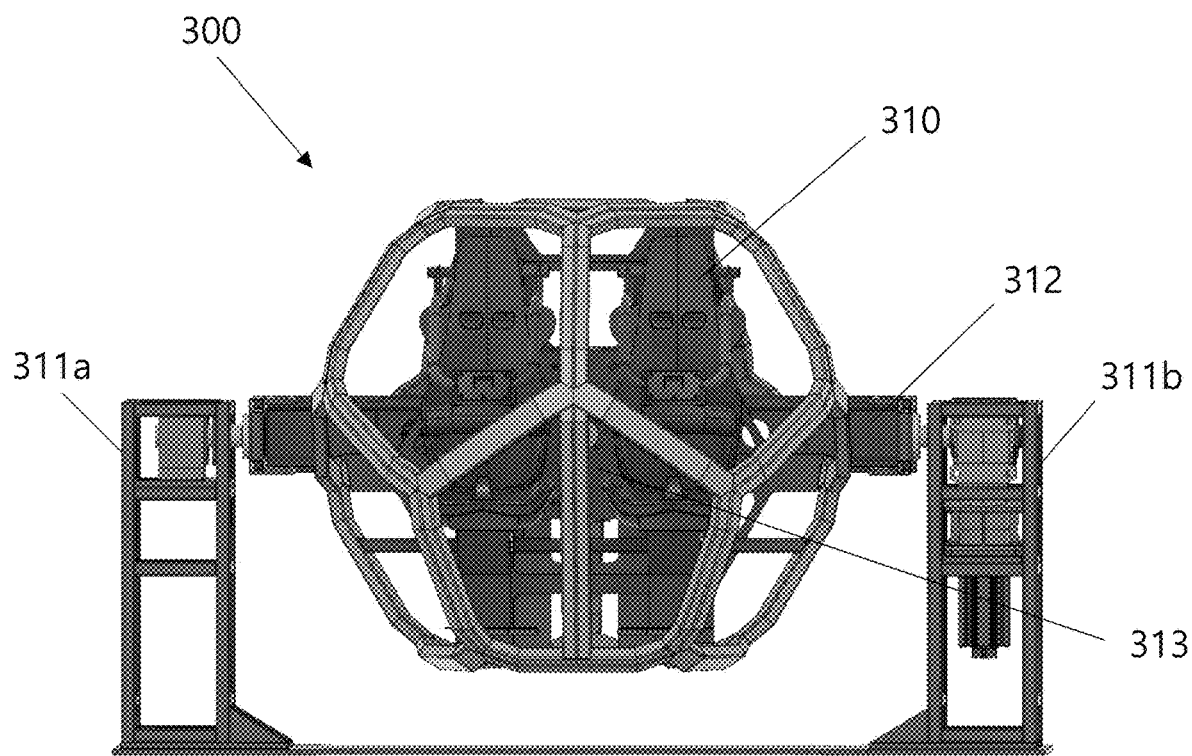
FIGS. 35 to 37 are front and perspective views illustrating a virtual reality experience apparatus according to still yet another embodiment of the present inventio.
Figure 36:
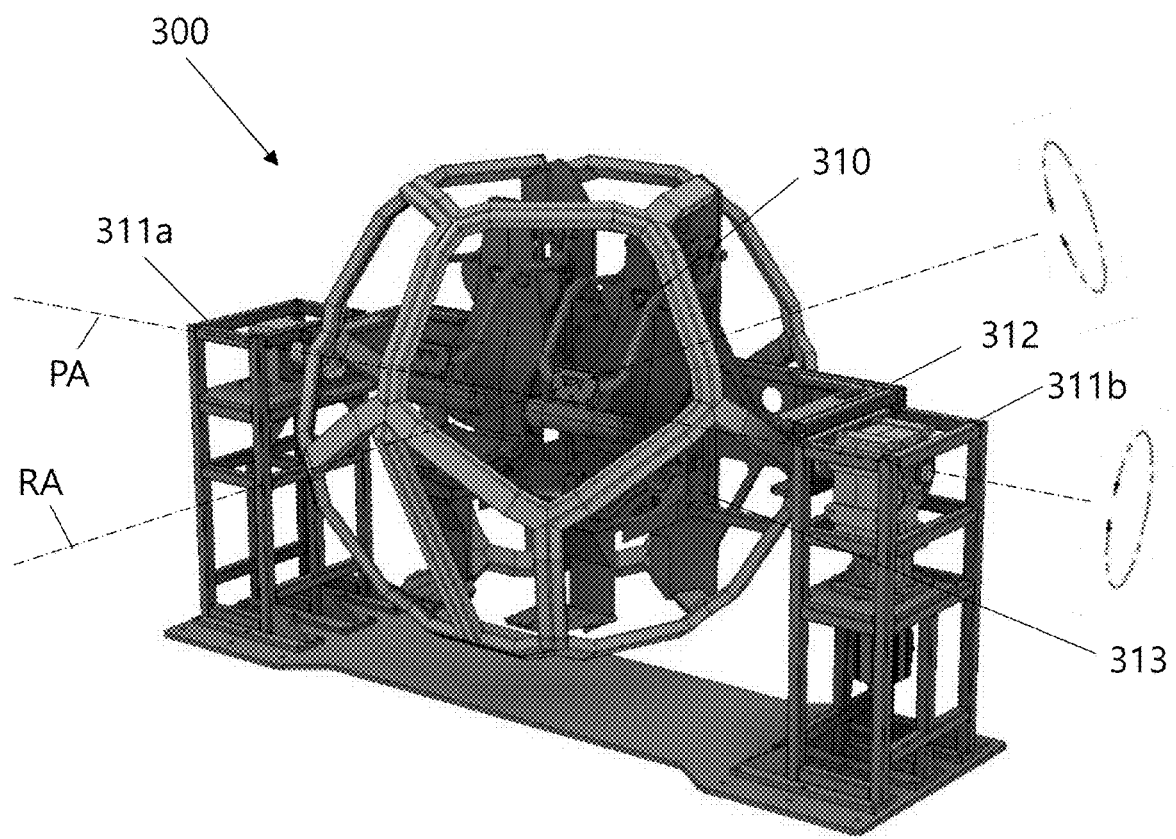
Figure 37:
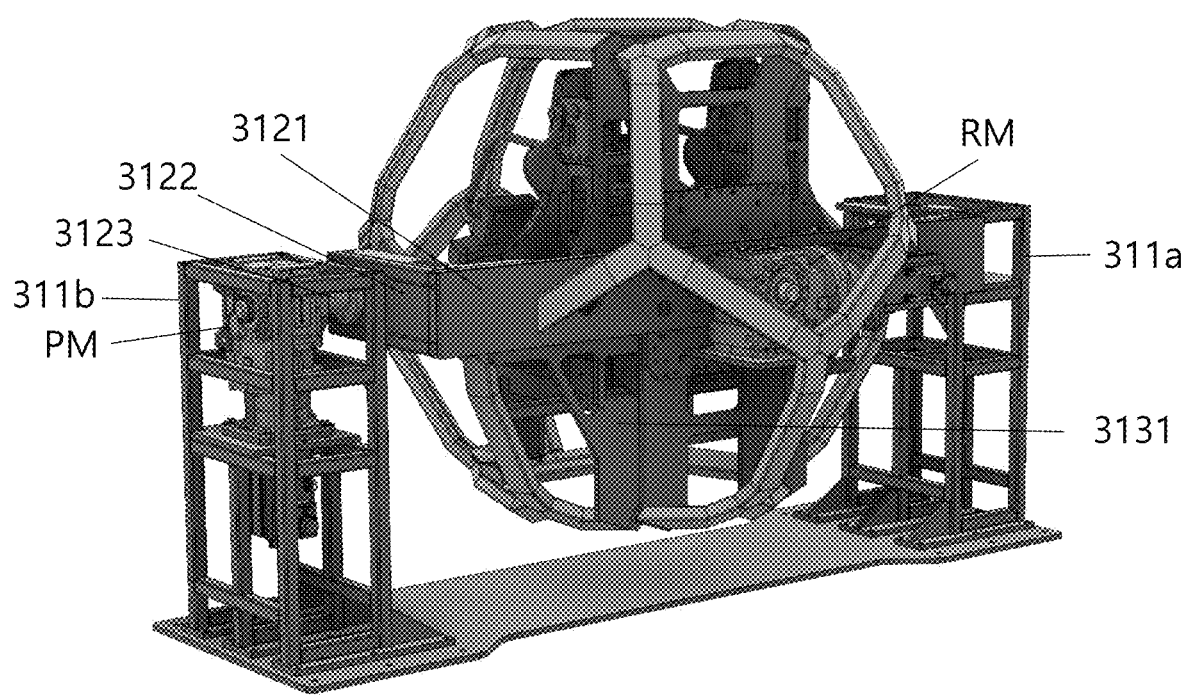

FIGS. 35 to 37 are front and perspective views illustrating a virtual reality experience apparatus according to still yet another embodiment of the present invention.

Referring to FIGS. 35 to 37, the virtual reality experience apparatus may include a riding device 300 having a riding part 310 providing the experiencing user with a ridable space, and a gyro mechanism generating a pitching motion and a rolling motion of the riding part 310. This gyro mechanism may include a base structure having a pair of support columns (311a and 311b) disposed apart from each other, a pitching mechanism 312 rotatably mounted on the pair of support columns (311a and 311b) to be rotated with respect to a pitching axis PA extending between the pair of support columns (311a and 311b), and a rolling mechanism 313 rotatably mounted on the pitching mechanism 312 to be rotated with respect to a rolling axis RA perpendicular to the pitching axis PA.

The pitching mechanism 312, as shown in FIGS. 35 to 37, may include a cross frame structure in which both end portions thereof are mounted on the pair of support columns (311a and 311b). Specifically, as shown in FIG. 37, the cross frame structure may include a support bar portion 3121 extending in parallel with the pitching axis PA and on which the rolling mechanism 313 is mounted, a pair of extending portions 3122 extended in a perpendicular direction from both ends of the support bar portion 3121, and a pair of rotational axis portions 3123 extended in a perpendicular direction from the pair of extending portions 3122 to be disposed in parallel with the support bar portion 3121. The pitching mechanism 312 may be rotated by a pitching motor PM installed in one of the support columns (311a and 311b) to be connected with the corresponding rotational axis portion of the cross frame structure. This pitching motor PM may be a slip ring motor to provide continuous 360° rotation while maintaining an electrical connection.

The rolling mechanism 313, as shown in FIG. 37, may include a support structure 3131 which is rotatably mounted on the support bar portion 3121 (preferably, at the center of the support bar portion) of the pitching mechanism 312. In this case, the riding part 310 is fixedly coupled to the rolling mechanism 313, in particular, to the support structure 3131 of the rolling mechanism 313. The rolling mechanism 313 may be rotated by a rolling motor RM installed on the support bar portion 3121 of the pitching mechanism 312 to be connected with a rotational axis portion (not shown) extended in a perpendicular direction from the support structure 3131 of the rolling mechanism 313. This rolling motor RM may also be a slip ring motor to provide continuous 360° rotation while maintaining an electrical connection.

In this embodiment, the displaying device may be a head mount display (HMD) mounted on a head of the experiencing user, or a display disposed in front of the riding part.

The present invention relates to a virtual reality experience apparatus, and more particularly, to a virtual reality experience apparatus capable of providing an image and a physical motion.

The invention claimed is:
1. A virtual reality experience apparatus, comprising:
a displaying device configured to provide an experiencing user with a virtual reality image; and
a riding device configured to provide the experiencing user with a motion,
wherein the riding device includes:
a riding part configured to provide the experiencing user with a ridable space, and
a gyro mechanism configured to generate a pitching motion and a rolling motion of the riding part,
wherein the gyro mechanism includes:
a base structure having a pair of support columns disposed apart from each other,
a pitching mechanism rotatably mounted on the pair of support columns to be rotated with respect to a pitching axis extending between the pair of support columns, and
a rolling mechanism rotatably mounted on the pitching mechanism to be rotated with respect to a rolling axis perpendicular to the pitching axis,
wherein the pitching mechanism includes a cross frame structure in which end portions thereof are mounted on the pair of support columns,
wherein the cross frame structure includes a support bar portion extending in parallel with the pitching axis and on which the rolling mechanism is mounted, and
wherein the rolling mechanism further includes a rolling motor disposed on the support bar portion of the pitching mechanism to be connected with the rolling axis.

2. The virtual reality experience apparatus of claim 1, wherein the cross frame structure further includes:
a pair of extending portions extended in a different direction from a longitudinal direction of the support bar portion from two ends of the support bar portion; and
a pair of rotational axis portions extended from the pair of extending portions to be disposed in parallel with the longitudinal direction of the support bar portion.

3. The virtual reality experience apparatus of claim 2, wherein the rolling mechanism further includes:
a support structure to which the riding part is fixedly coupled; and
a rotational axis portion extended in a perpendicular direction from the support structure to be rotatably connected to the support bar portion.

4. The virtual reality experience apparatus of claim 1, wherein the pitching mechanism further includes a pitching motor disposed in one of the support columns of the base structure to be connected with a rotational axis portion of the cross frame structure, wherein the pitching motor is a slip ring motor.

5. The virtual reality experience apparatus of claim 1, wherein the rolling motor is a slip ring motor.

6. The virtual reality experience apparatus of claim 1, wherein the displaying device is a head mount display (HMD) mountable on a head of the experiencing user, or a display disposed in front of the riding part.

7. The virtual reality experience apparatus of claim 1, further comprising a common screen configured to provide a non-experiencing user with the same virtual reality image.

8. A virtual reality experience apparatus, comprising:
a displaying device configured to provide an experiencing user with a virtual reality image; and
a riding device configured to provide the experiencing user with a motion,
wherein the riding device includes:
a riding part configured to provide the experiencing user with a ridable space, and
a gyro mechanism configured to generate a pitching motion and a rolling motion of the riding part,
wherein the gyro mechanism includes:
a base structure having a pair of support columns disposed apart from each other,
a pitching mechanism rotatably mounted on the pair of support columns to be rotated with respect to a pitching axis extending between the pair of support columns, and
a rolling mechanism rotatably mounted on the pitching mechanism to be rotated with respect to a rolling axis perpendicular to the pitching axis,
wherein the displaying device provides an image corresponding to a visual field of the experiencing user extracted from an omnidirectional image of the virtual reality image, and wherein the visual field is corrected in a manner that a motion of the riding device is excluded from a motion of the displaying device, the virtual reality experience apparatus, further comprising:

a controller configured to calculate the visual field, wherein the controller subtracts a measured value of the motion of the riding device from a measured value of the motion of the displaying device, and calculates the visual field based on a resulting value obtained by the subtraction.

9. The virtual reality experience apparatus of claim 1, further comprising:

a controller configured to control the displaying device and the riding device, wherein the controller generates a plurality of time stamp codes specifying a plurality of points in time included in an experiencing time from an experience start point to an experience end point, and synchronizes the virtual reality image with a motion of the riding device using the plurality of time stamp codes.

10. The virtual reality experience apparatus of claim 9, wherein the controller comprises:

an editor configured to generate the time stamp codes;

an image controller configured to control the displaying device; and a driving controller configured to control a driving apparatus, wherein the editor generates the virtual reality image changing as time passes, generates the plurality of time stamp codes respectively specifying the plurality of points in time as first to n-th time stamps, generates a first database specifying first to n-th images respectively reproduced at the first to n-th time stamps, and generates a second database specifying first to n-th motions respectively carried out at the first to n-th time stamps, and wherein the controller sequentially transmits the first to n-th time stamps at a predetermined time interval once an experience starts simultaneously to the image controller and the driving controller.

11. The virtual reality experience apparatus of claim 10, wherein the image controller applies a time stamp received from the controller to the first database to select an image corresponding to the received time stamp among the first to n-th images and transmits the selected image to the displaying device, and wherein the driving controller applies the time stamp received from the controller to the second database to select a motion corresponding to the received time stamp among the first to n-th motions and transmits the selected motion to the riding device.

12. The virtual reality experience apparatus of claim 11, wherein the image controller compares a target image and an actual image at a predetermined frequency interval and makes the target image and the actual image coincide with each other, and wherein the driving controller compares a target motion and an actual motion at a predetermined time interval and makes the target motion and the actual motion coincide with each other.

* * * * *